United States Patent [19]
Bergstrom et al.

[11] Patent Number: 6,008,624
[45] Date of Patent: Dec. 28, 1999

[54] METHOD OF MONITORING AND CONTROLLING ELECTROCHEMICAL SYSTEMS AND PROCESSES

[76] Inventors: Gary E. Bergstrom, 191 Miles Rd.; King G. Heiple, 8147 Chagrin Mills Rd., both of Chagrin Falls, Ohio 44022

[21] Appl. No.: 08/854,101

[22] Filed: May 9, 1997

[51] Int. Cl.$^6$ .................................................. H02J 7/00
[52] U.S. Cl. ........................................................... 320/128
[58] Field of Search ................................ 320/128, 136, 320/116, 161, 132, 148

[56] References Cited

U.S. PATENT DOCUMENTS

| | | | |
|---|---|---|---|
| 3,421,067 | 1/1969 | Wilson et al. | 320/128 |
| 3,424,969 | 1/1969 | Barry | 320/161 |
| 3,517,293 | 6/1970 | Burkett et al. | 320/129 |
| 3,639,173 | 2/1972 | Starchurski | 320/162 |
| 3,816,806 | 6/1974 | Mas | 320/129 |
| 3,816,807 | 6/1974 | Taylor | 320/139 |
| 4,260,943 | 4/1981 | Zaderej et al. | 320/140 |
| 4,270,080 | 5/1981 | Kostecki | 320/160 |
| 4,560,937 | 12/1985 | Finger | 320/136 |
| 4,629,965 | 12/1986 | Fallon et al. | 320/156 |
| 4,656,411 | 4/1987 | Carlson | 320/116 |
| 4,687,996 | 8/1987 | Okazaki et al. | 320/136 |
| 4,724,290 | 2/1988 | Campbell | 219/729 |
| 4,829,225 | 5/1989 | Podrazhansky et al. | 320/129 |
| 4,843,299 | 6/1989 | Hutchings | 320/125 |
| 4,956,597 | 9/1990 | Heavey et al. | 320/129 |
| 5,008,794 | 4/1991 | Leman | 363/21 |
| 5,049,804 | 9/1991 | Hutchings | 320/110 |
| 5,132,605 | 7/1992 | Boella et al. | 320/137 |
| 5,132,606 | 7/1992 | Herbert | 323/266 |
| 5,153,496 | 10/1992 | LaForge | 320/119 |
| 5,250,904 | 10/1993 | Salander et al. | 320/136 |
| 5,341,503 | 8/1994 | Gladstein et al. | 320/136 |
| 5,365,160 | 11/1994 | Leppo et al. | 320/160 |
| 5,396,163 | 3/1995 | Nor et al. | 320/159 |
| 5,403,093 | 4/1995 | Flynn, Jr. et al. | 320/150 |
| 5,408,170 | 4/1995 | Umetsu et al. | 320/148 |
| 5,412,306 | 5/1995 | Meadows et al. | 320/139 |
| 5,463,305 | 10/1995 | Koenck | 320/145 |
| 5,467,005 | 11/1995 | Matsumoto et al. | 320/145 |
| 5,469,043 | 11/1995 | Cherng et al. | 320/161 |
| 5,477,125 | 12/1995 | Ettel et al. | 320/156 |

*Primary Examiner*—Peter S. Wong
*Assistant Examiner*—Lawrence Luk
*Attorney, Agent, or Firm*—Pierce Atwood; Chris A. Caseiro; John X. Garred

[57] ABSTRACT

A method of determining electrochemical charge acceptance limits by measuring and determining the peak of the curve of Differential Equivalent Series Resistance (DESR) of a cell or system for the purpose of monitoring or controlling processes internal to the cell/system (i.e.; state-of-charge or state-of-formation) or for monitoring or controlling processes external to the cell/system (i.e.; battery chargers or battery formers). The method is suitably embodied in software, firmware, hardware, or apparatus.

28 Claims, 18 Drawing Sheets

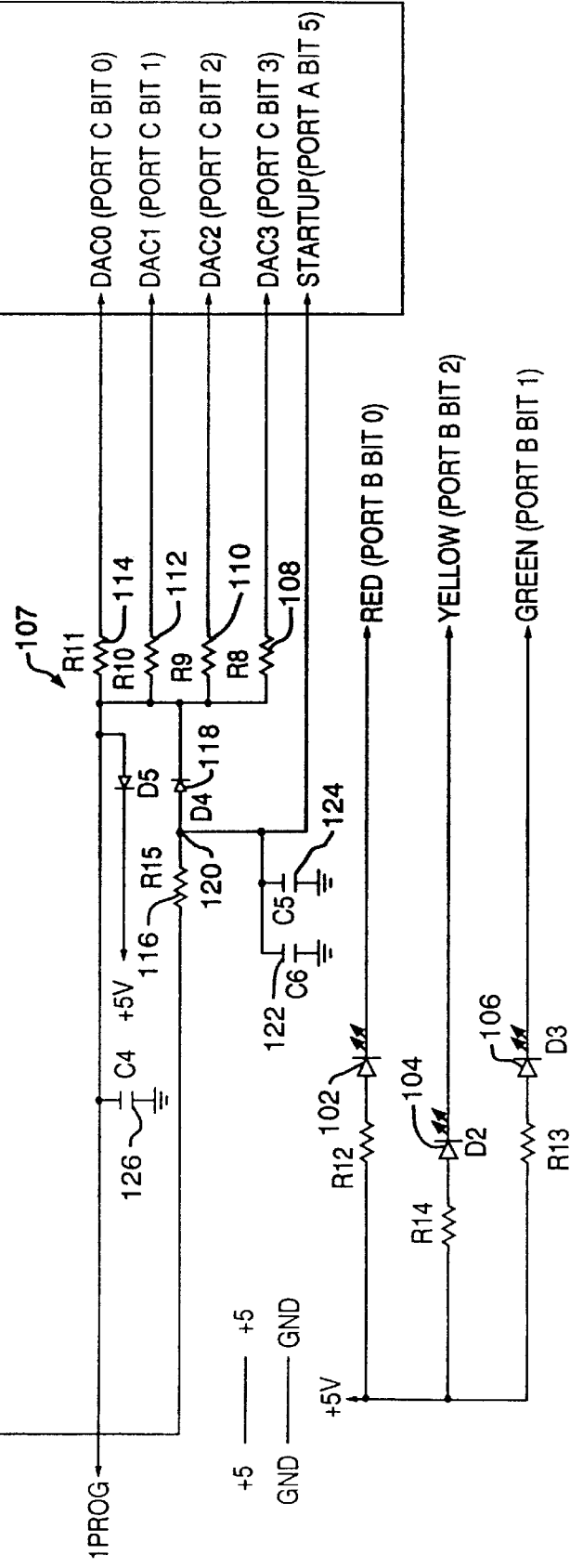

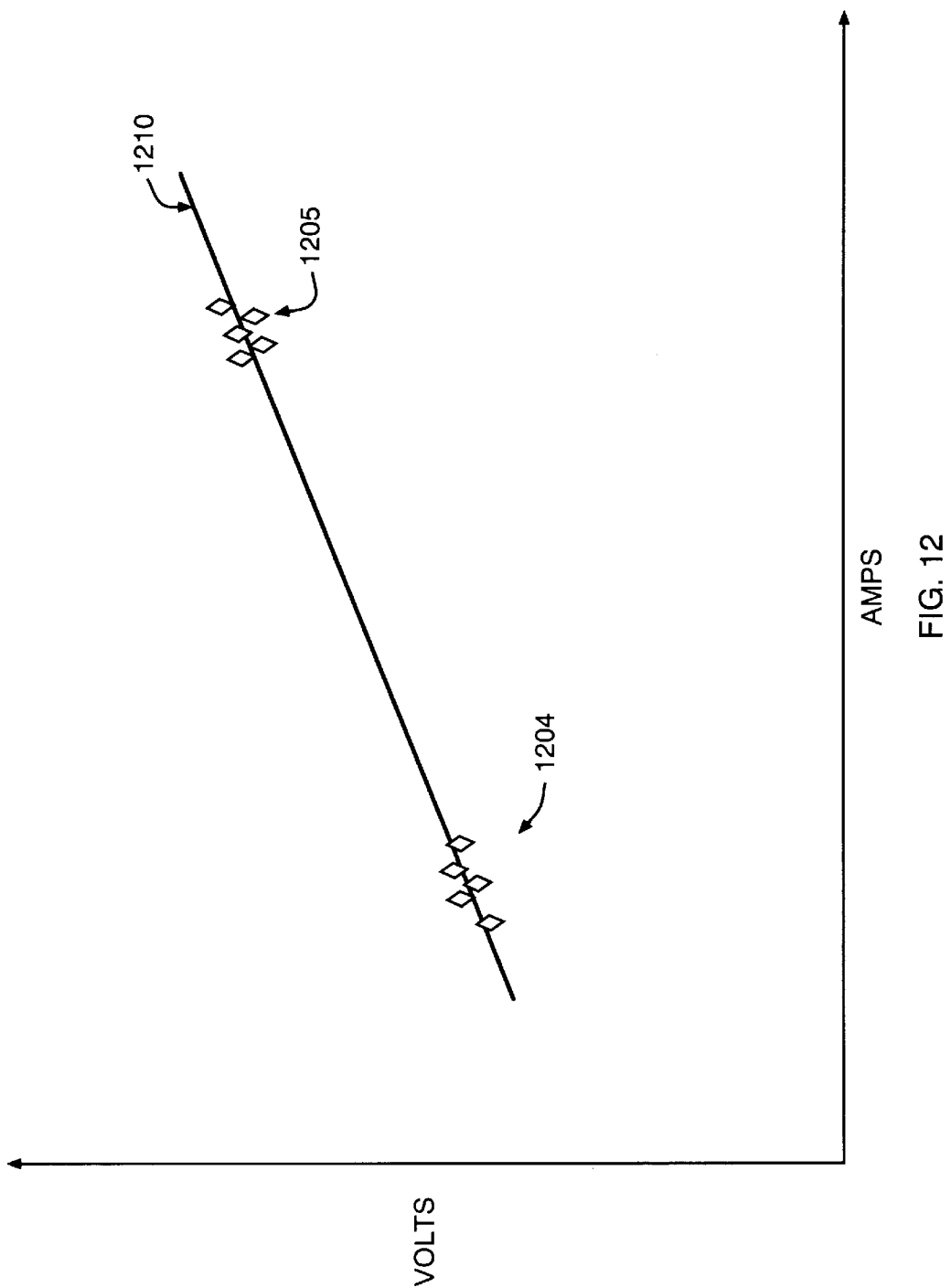

METHOD OF MONITORING AND CONTROLLING ELECTROCHEMICAL SYSTEMS AND PROCESSES

BACKGROUND OF THE INVENTION

The present invention relates generally to charging and discharging electrochemical systems and more particularly to improved methods and apparatus for monitoring, manufacturing, charging, and discharging electrochemical cells and systems commonly referred to as batteries.

Although rechargeable batteries are available in many different styles and having many different chemistries, they all share a common dependence upon optimal charging for optimal performance. The consequences of non-optimal charging are largely two-fold.

The first consequence is the most obvious in that failure to provide a full charge to a battery will result in less than the maximum potential energy available to operate the system to which the battery is attached. This results in more frequent charging and less operating time between charges for the powered system. A second consequence is not as obvious, but may become far more important to sophisticated users. This consequence is the loss of battery life which translates directly into cost-of-ownership of the battery. Depending upon the chemistry or construction of a battery, undercharging or overcharging a battery has different but detrimental effects on the usable life of the battery.

The bulk of battery chargers on the market are either constant current chargers that charge to a specified voltage end point, or constant voltage chargers. Some are two stage chargers that charge at a constant current to some voltage and then switch to constant voltage. Constant current chargers are fast but tend to undercharge batteries. Constant voltage chargers are slow. Both types and their hybrid suffer from the fact that their end voltage is set by design and, therefore, is almost never optimum. Some chargers have added sensors to compensate for the temperature coefficient of battery terminal voltage which addresses only one variable. Some newer chargers have implemented dV/dt detection as a method of terminating charging, which still requires the choice of a dV/dt limit, which is also sensitive to various parameters.

Pressure monitoring has also been proposed as a specific solution for lead acid batteries. Some recent chargers use the exothermic or endothermic behavior of some chemistries at full charge as a method to stop charging. Taylor (U.S. Pat. No. 3,816,807) proposes a method of imposing an AC voltage on top of a DC charging current and monitoring the behavior of the complex impedance that results from the AC voltage with a phase detector. He describes a relationship between the real (in phase) impedance and the imaginary (out of phase) impedance that can be used to maintain the output of a charger close to the acceptance limit of a battery. Cherng (U.S. Pat. No. 5,469,043) proposes a method of sweeping a charging voltage from low to high and using information contained in a dV/dI curve to determine the optimum charging voltage. Both of these methods are complex and expensive to implement.

SUMMARY OF THE INVENTION

Ideally, chargers and methods of charging should have the ability to sense the charge acceptance limit of electrochemical cells and systems during charging so that they could provide the maximum current that can be electrochemically converted into stored energy at as close to 100% efficiency and as economically as possible. This would significantly reduce gassing or other secondary reactions and the associated temperature increase and degradation of both the positive and negative plates and would significantly reduce the cost of ownership.

Accordingly, in order to provide a simple method of optimally charging batteries that takes into account the multiple factors that can influence battery performance, a method was developed of extracting a parameter from batteries that could be used to predict the charge acceptance limit of a battery at a given point in time and under a given set of conditions. It should be noted that, once a particular design is completed, this type of charger treats batteries like a 'black box'. The result is that the charger can be attached to any battery of the type for which it was designed and it will optimally charge it at that point in time without any prior knowledge about the battery or its history.

The parameter that is extracted is referred to as the Dynamic Equivalent Series Resistance (DESR). The DESR measurement is placed in perspective by an explanation of FIGS. 11 and 12. FIG. 11 illustrates a hypothetical graph 1102 of charging voltage versus charging current for a given state of charge of a battery. For generality, the scales on the axes are not given, except that the zero on the horizontal scale of "AMPS" is intended to lie on the left-hand vertical axis. The vertical scale is exaggerated, having the appearance that results when the zero-volt level lies well below the horizontal axis, so that relatively small fractional changes in voltage are spread out vertically. The clusters of dots e.g. clusters 1104 and 1105 of FIG. 11, which become clusters 1204 and 1205 of FIG. 12, represent data pairs of voltage and current clustered about different charger output settings. It is presumed that an output setting for the charger represents a nominal voltage with a significant output resistance, so that current flow lowers that voltage output significantly below the open-circuit setting, such that changing conditions in the battery cause significant changes in both the voltage and the current readings at a fixed output setting. Thus, a combination of electronic noise, quantization error, and dynamically changing conditions within the battery will produce scatter among the (current, voltage) data pairs at a given output setting. The sigmoidal curve 1102 fitted to the data clusters represents the nonlinear voltage response of the battery to charging current at a given state of charge. The slope of this curve represents DESR, the Dynamic Effective Series Resistance of the battery. To determine DESR for a given portion of the curve of FIG. 11, FIG. 12 illustrates how a straight line slope is fitted to data from the data clusters lying inside circle 1120 of FIG. 11. The data points, seen as diamonds on the magnified scale of FIG. 12, are used to define the slope of straight line 1210, which is also visible as line 1110, which separates slightly at its ends from curve 1102.

A number of algorithms are available to define a correlation slope for the data points in FIG. 12. For example, the controller may be set alternately to the lower and upper of the two output settings and, after each transition up or down and following a settling time at a new setting, a (current, voltage) data pair is read and used, in conjunction with the most recent previous data pair at the other output setting, to compute a delta (voltage)/delta (current) slope, which is a DESR. The average of the slopes of the lines zig-zagging between the points of the data clusters is then taken as a correlation slope for the data. A more traditional mathematical approach is the well known method of determining a least-squares straight line fit to the data points in the two clusters, using the slope of that fit as an approximation of DESR. Alternatively, for data in pairs of clusters as illustrated, the 'center of gravity' for the left hand data cluster can be computed by averaging the values of voltage and current to define a single averaged data pair, (current, voltage). A similar data pair is determined for the right hand data cluster. The slope of the line connecting base these two 'centers of gravity' for the two data clusters then represents a correlation slope, which is practical approximation of DESR for the region of the curve spanned by the two data clusters. Thus, the term "correlation slope" is seen to cover any of a large number of approaches to determining the slope of a line fitting data points with scatter. The DESR will be lower toward the ends of the curve of FIG. 11 and will peak in the vicinity of the middle, as illustrated, e.g., in the graph from the family of curves in FIG. 2 labeled with rising slope A, peak DESR at B, and descending slope C.

As a comment on the sigmoidal shape of graph 1102 with respect to charging batteries, it is theorized that the lower voltage level of the left hand end of the graph represents the electrochemical potential of the battery plus a small linear series resistance. The higher voltage level of the left hand end of the graph represents a condition in which an unwanted electrolytic chemical reaction, e.g., generation of hydrogen gas) is at least partially controlling the charging voltage. The transition from the desired kind of charging to the unwanted kind of charging occurs over the region of steeper slope in the middle of the sigmoidal curve. The vicinity of the charge acceptance limit for the desired chemical reaction is suggested by the maximum slope of the sigmoidal curve, where DESR is at a maximum. The system taught here causes charging to take place in the vicinity of this maximum slope. Regardless of the accuracy of this theoretical conjecture regarding the nature of the sigmoidal curve of voltage versus current, it is observed empirically that charging a battery at or near the peak of the DESR curve, with attention to appropriate time delays in taking data relating voltage to charging current, results in battery charging at a high rate while maintaining good battery life.

It is a principal object of the present invention to describe a method of extracting a parameter that is useful in the formation of, charging, and monitoring of electrochemical cells and other energy storage systems.

It is a further object of the present invention to provide a method to monitor and control the charging of batteries.

It is a further object of the present invention to provide a method that optimally charges batteries by attempting to avoid undercharging and overcharging.

It is a further object of the present invention to provide a cost effective solution to the challenge of optimally charging batteries that will optimize their usable life.

The present invention is a method of extracting a particular electrochemical parameter that can be used to control the manufacture of batteries, the formation of batteries, the charging and discharging of batteries, and the monitoring of batteries. The parameter that is sought is referred to as the Differential Equivalent Series Resistance (DESR).

To facilitate a description of the invention, a battery charger for use with lead-acid batteries will be described in detail. Drawings are provided demonstrating the parameter to be extracted and the ways in which it is used to implement a battery charger. This technique is meant to be illustrative only and in no way is it meant to limit the scope of the invention.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

'A'=(V@17 AMPS−V@16 AMPS)/(17 AMPS−16 AMPS)

'B'=(V@15 AMPS−V@14 AMPS)/(15 AMPS−14 AMPS)

'C'=(V@13 AMPS−V@12 AMPS)/(13 AMPS−12 AMPS)

'D'=(V@11 AMPS−V@10 AMPS)/(11 AMPS−10 AMPS)

'E'=(V@9 AMPS−V@8 AMPS)/(9 AMPS−8 AMPS)

'F'=(V@7 AMPS−V@6 AMPS)/(7 AMPS−6 AMPS)

'G'=(V@5 AMPS−V@4 AMPS)/(5 AMPS−4 AMPS)

'H'=(V@3 AMPS−V@2 AMPS)/(3 AMPS−2 AMPS)

Figure 1:
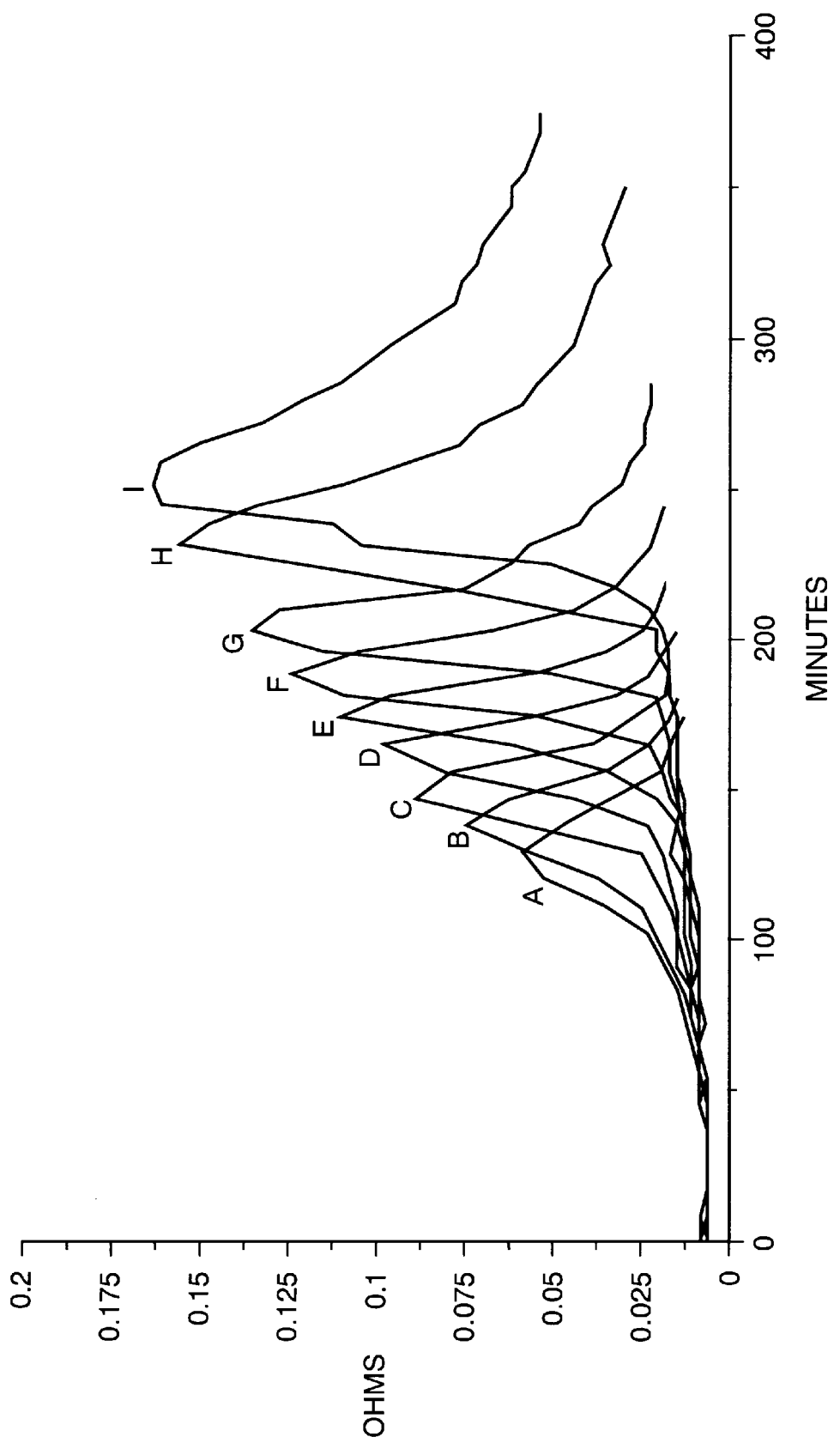
FIG. 1 This figure shows a family of 9 DESR curves labeled 'A' through 'I'. The Y-axis units are ohms and the X-axis units are minutes. The curves were generated over time by intentionally over-charging a typical lead-acid battery using one amp increments of current from 17 amps to 0 amps.
Figure 2:
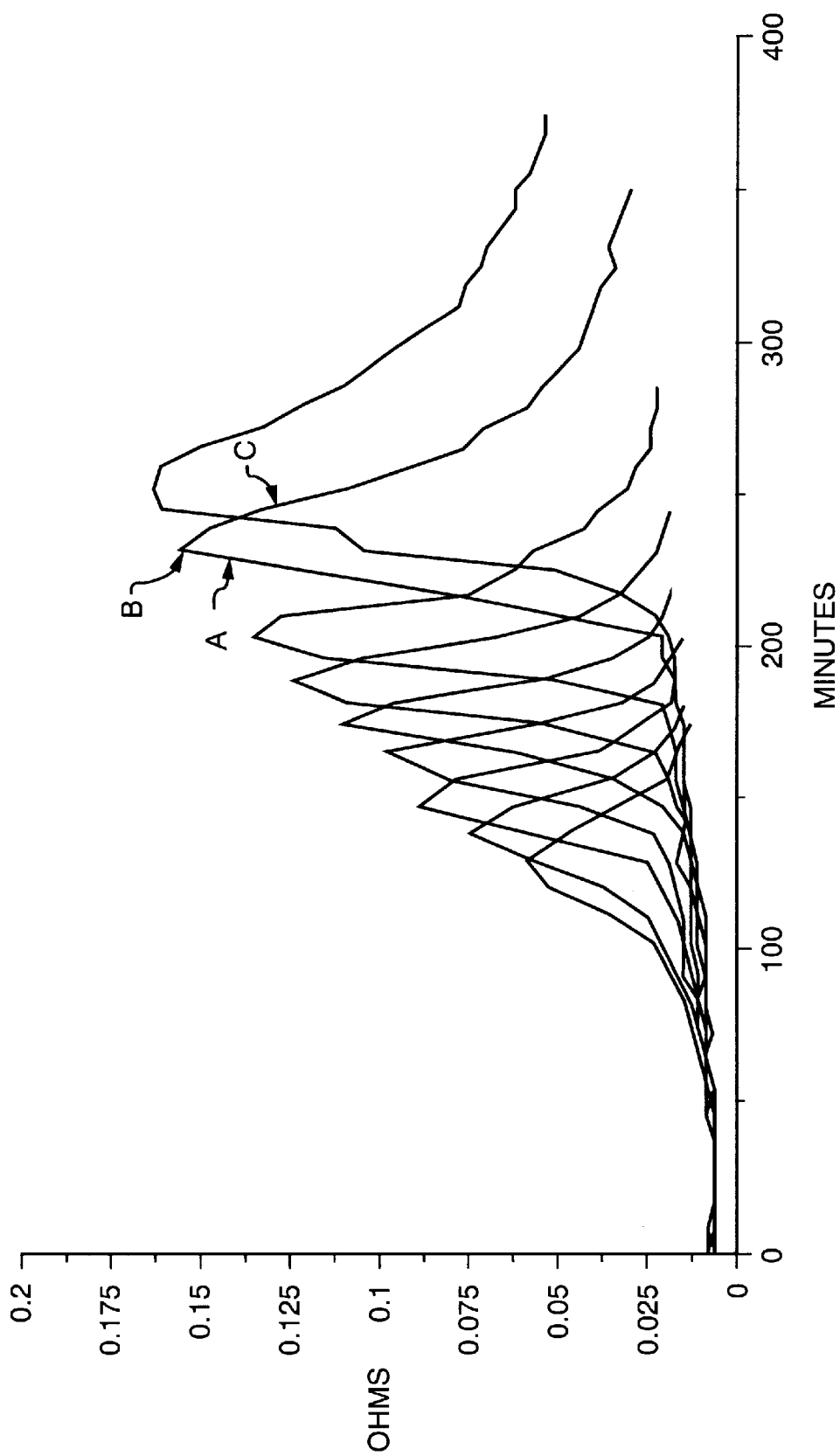

'I'=(V@1 AMPS−V@0 AMPS)/(1 AMPS−0 AMPS);

FIG. 2 This is the same family of curves shown in FIG. 1 with portions of what is labeled as the 'H' DESR curve in FIG. 1 marked as follows:

'A'=the portion of DESR curve 'H' where DESR/dt is positive

'B'=the portion of DESR curve 'H' where dDESR/dt peaks

Figure 3:
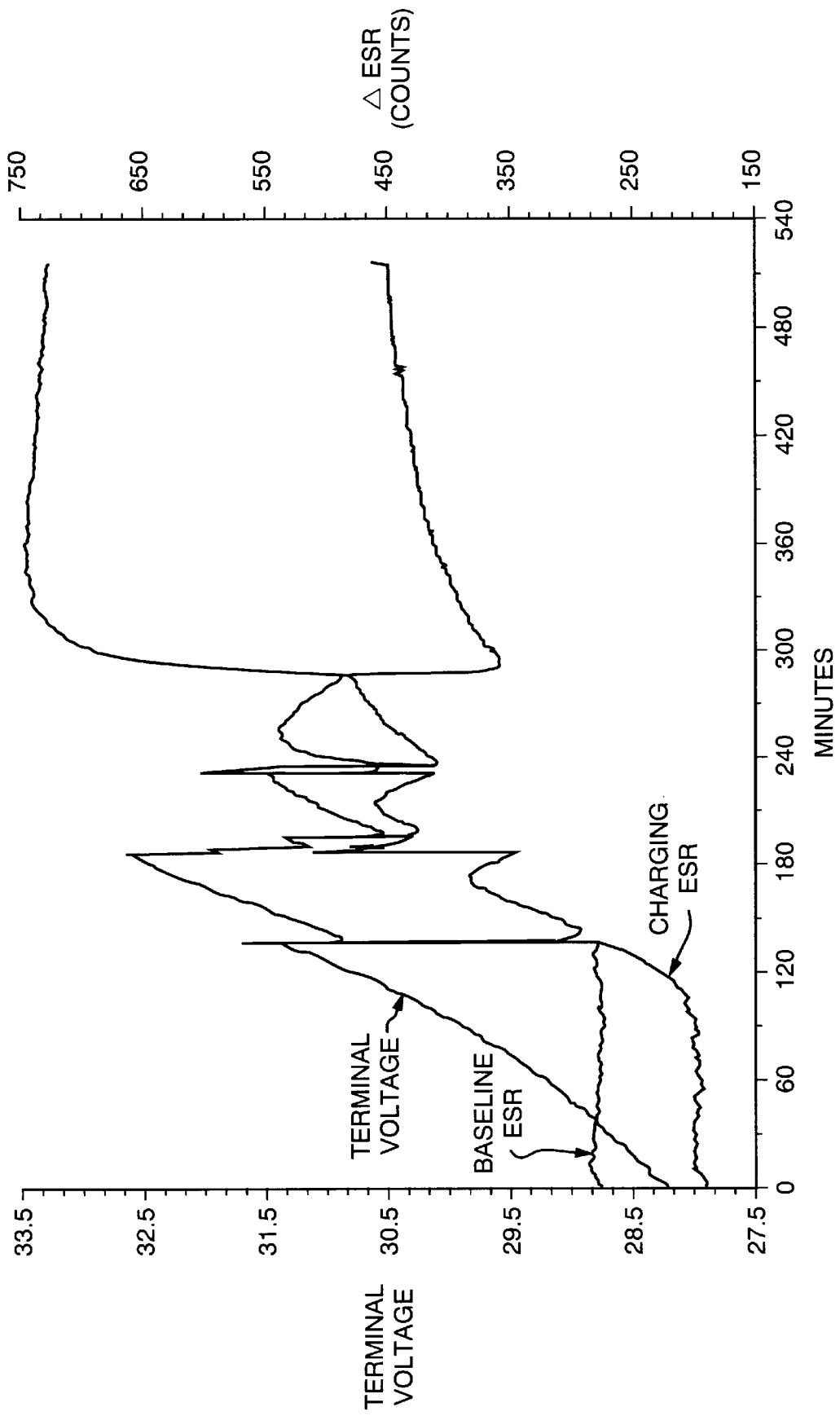
Figure 4:
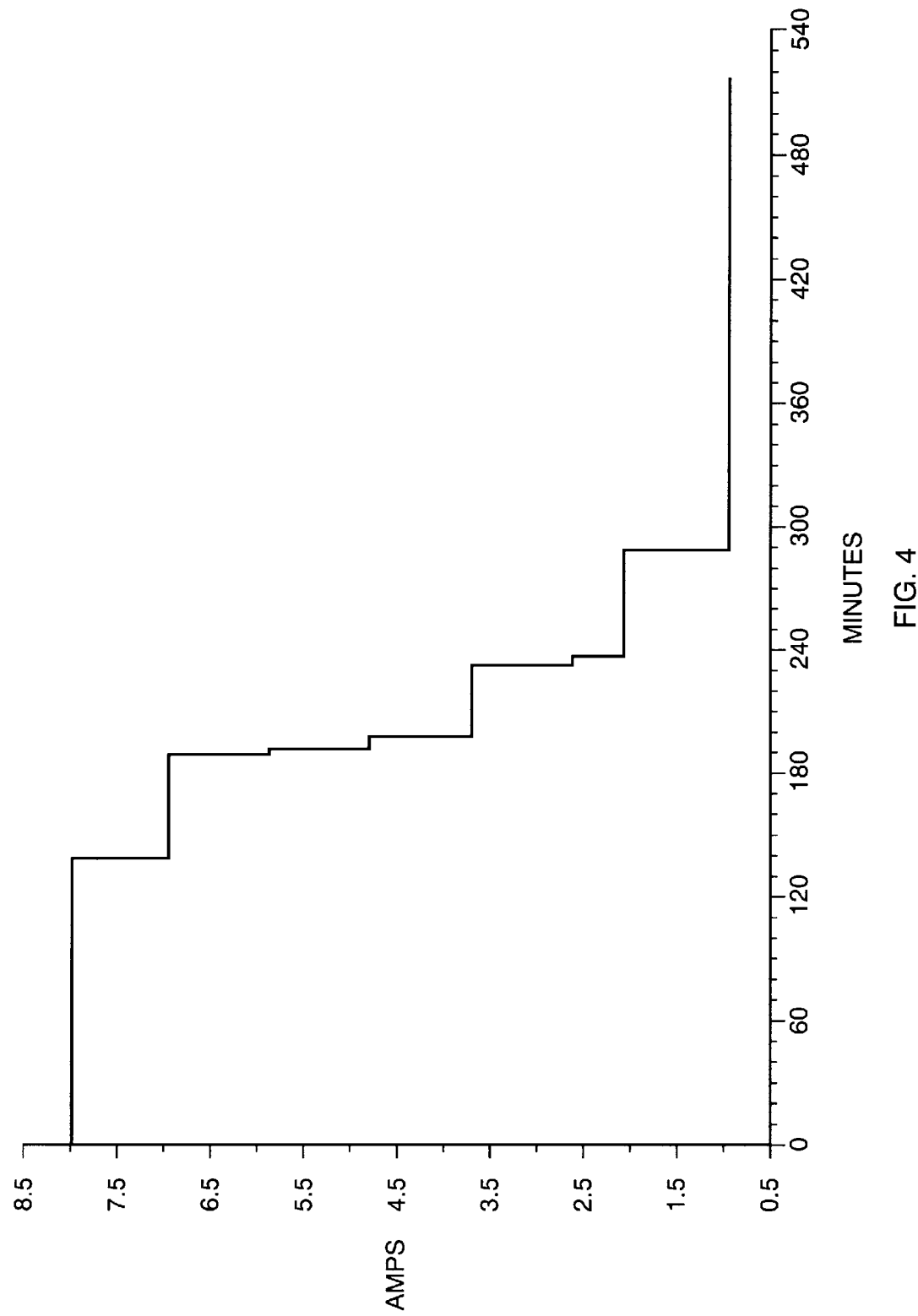
Figure 5:
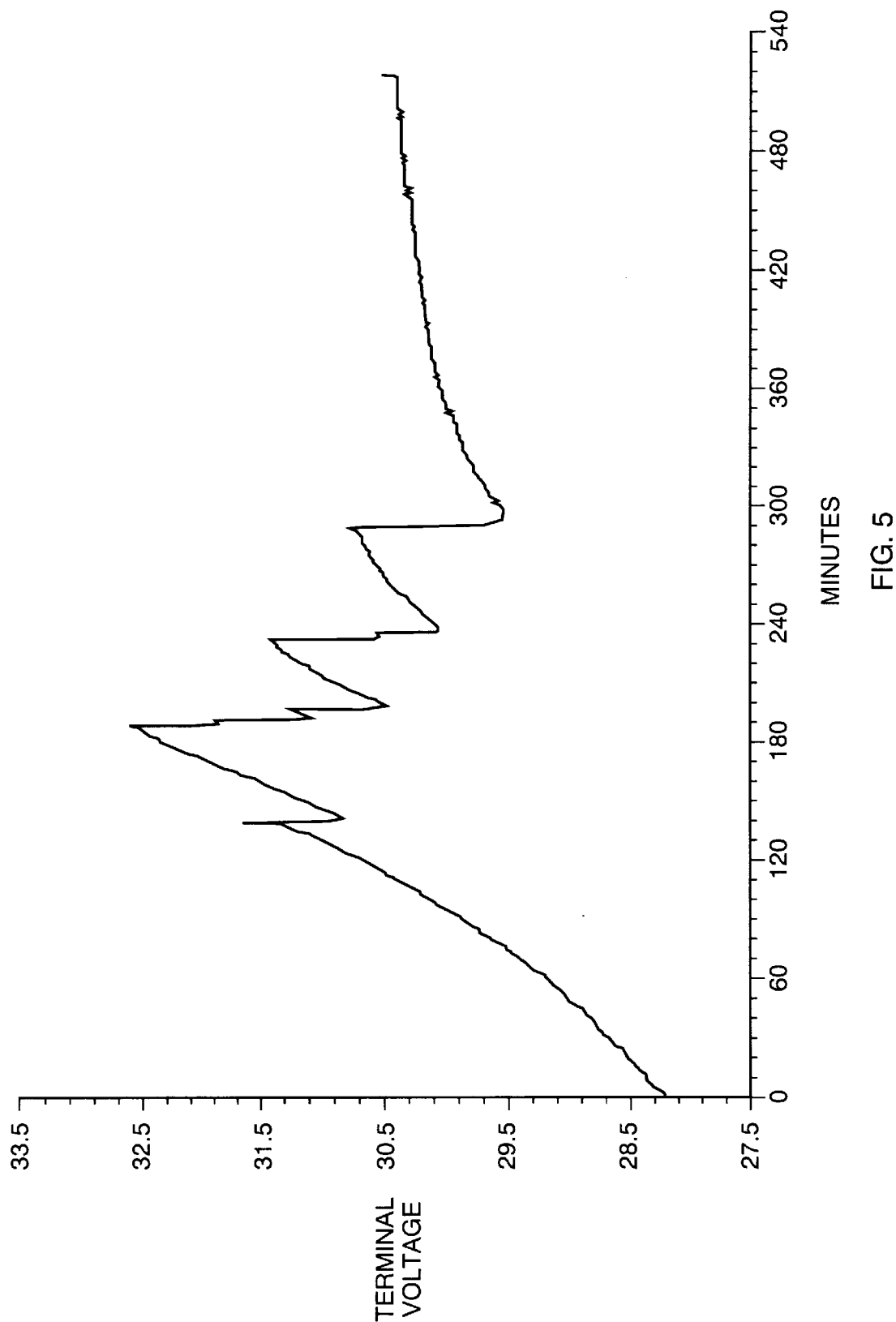
Figure 6:
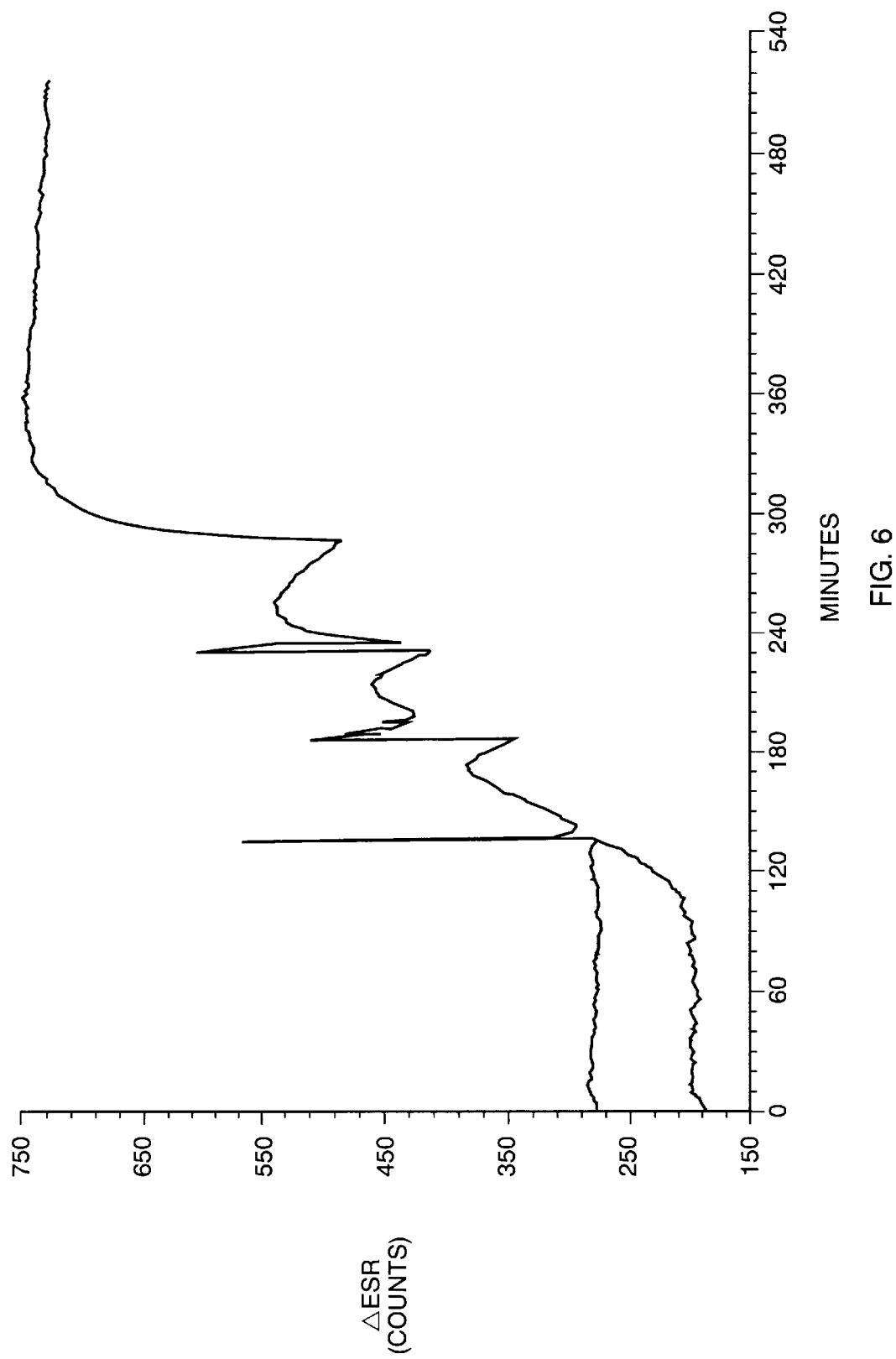
Figure 7:
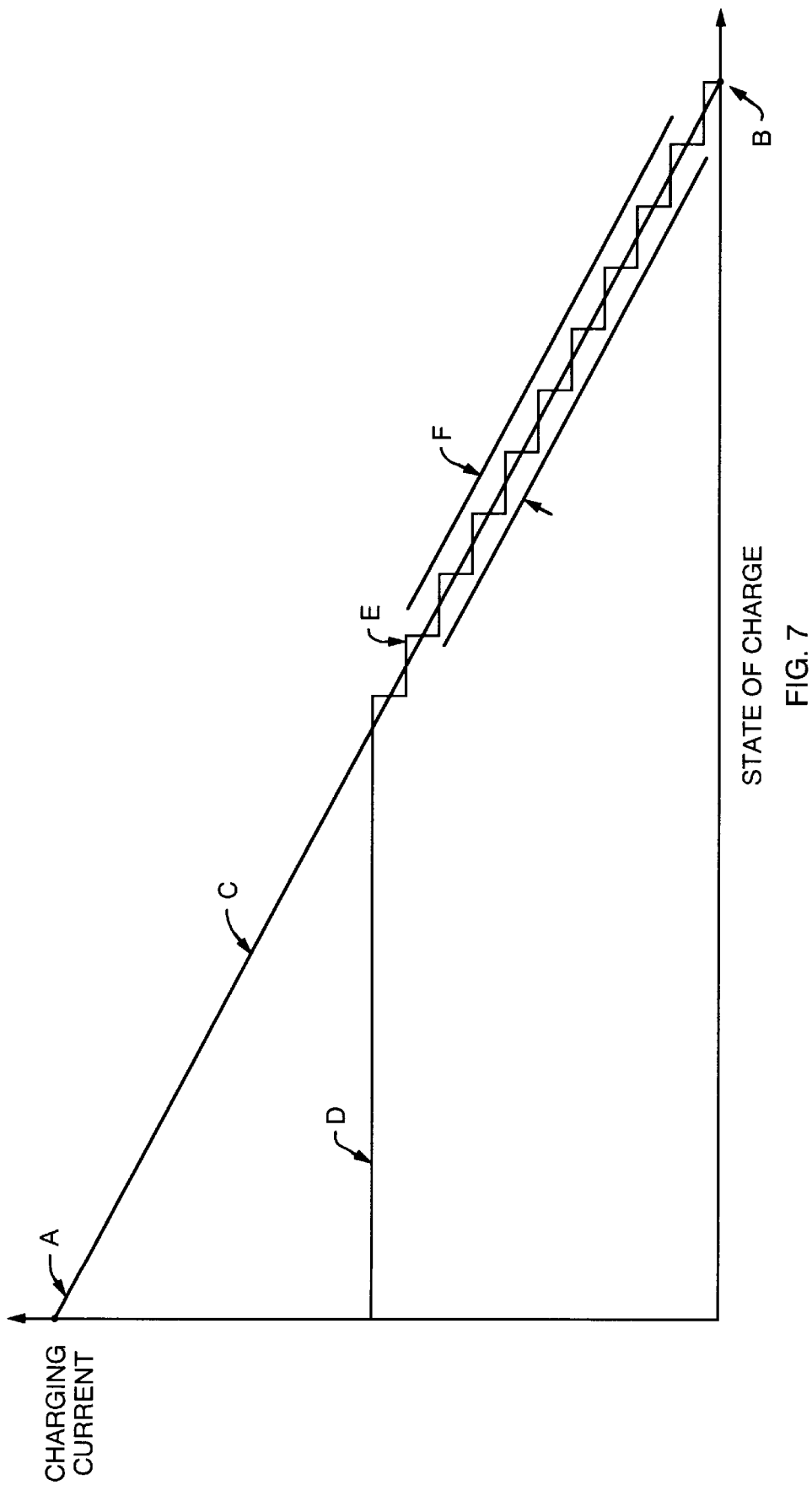
Figure 8A:
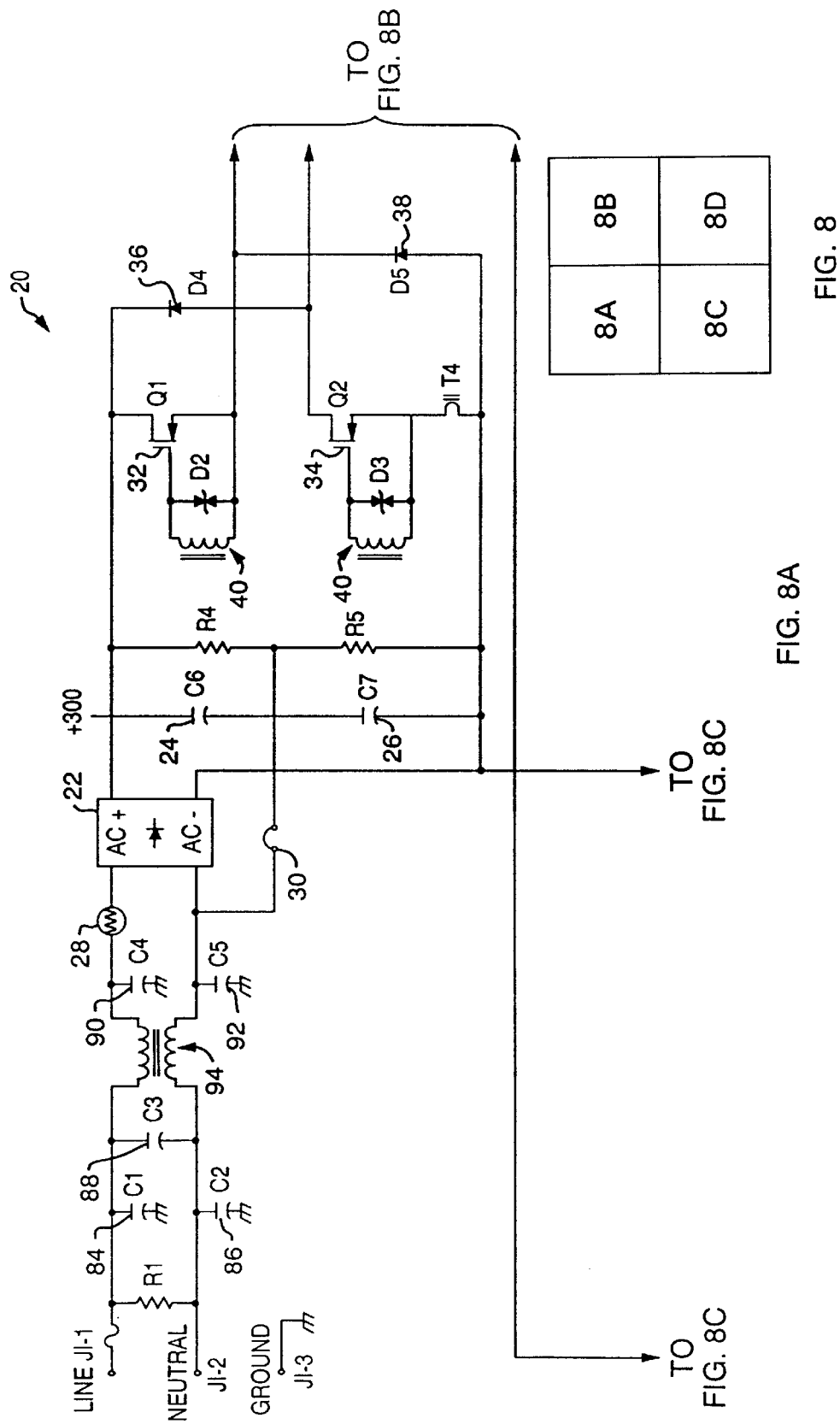
Figure 8B:
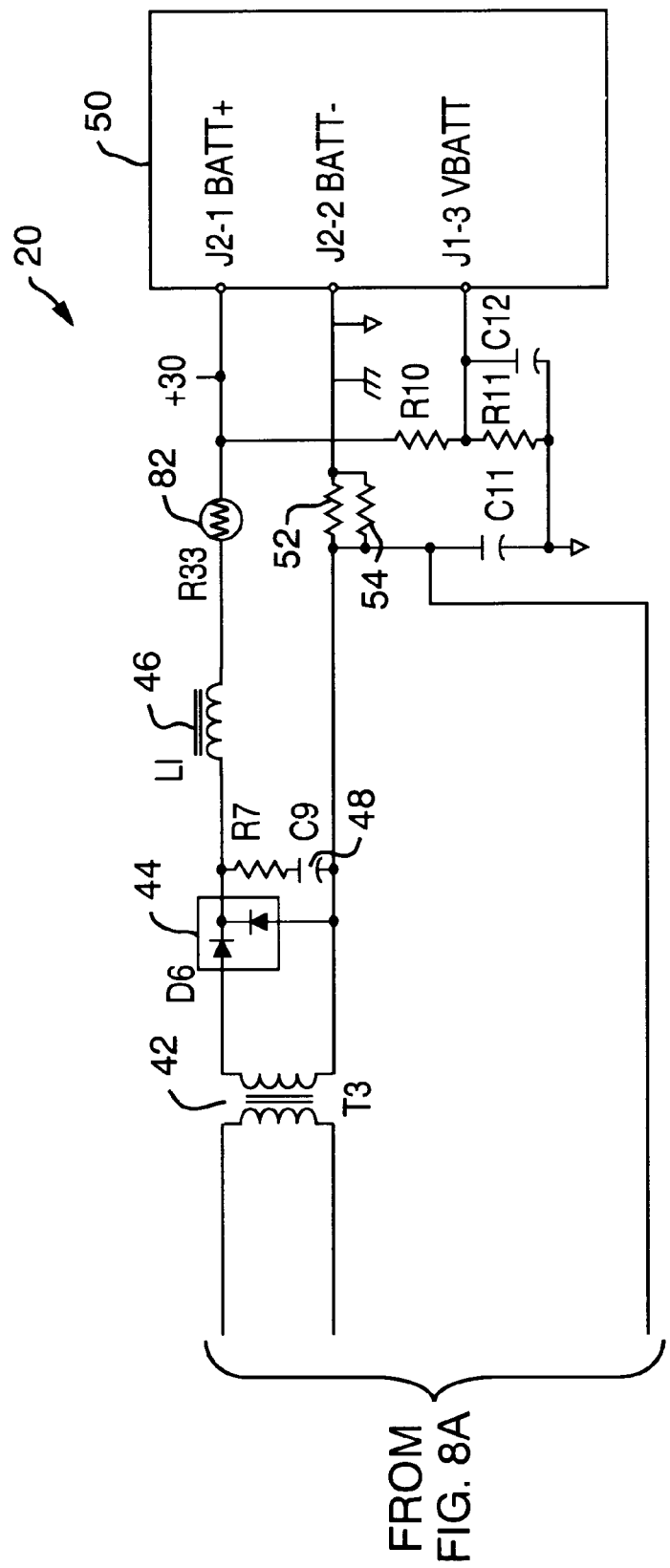
Figure 8C:
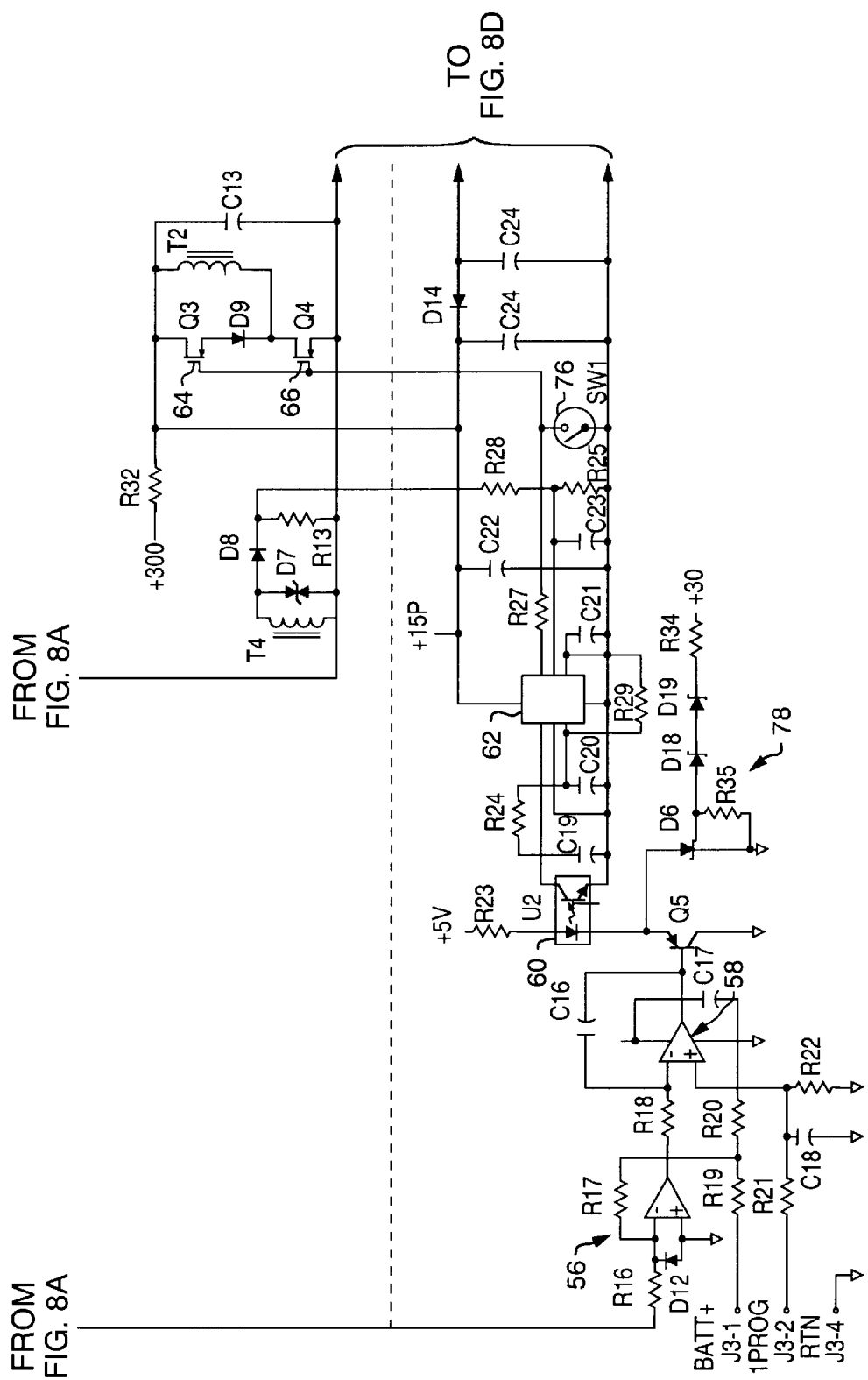
Figure 8D:
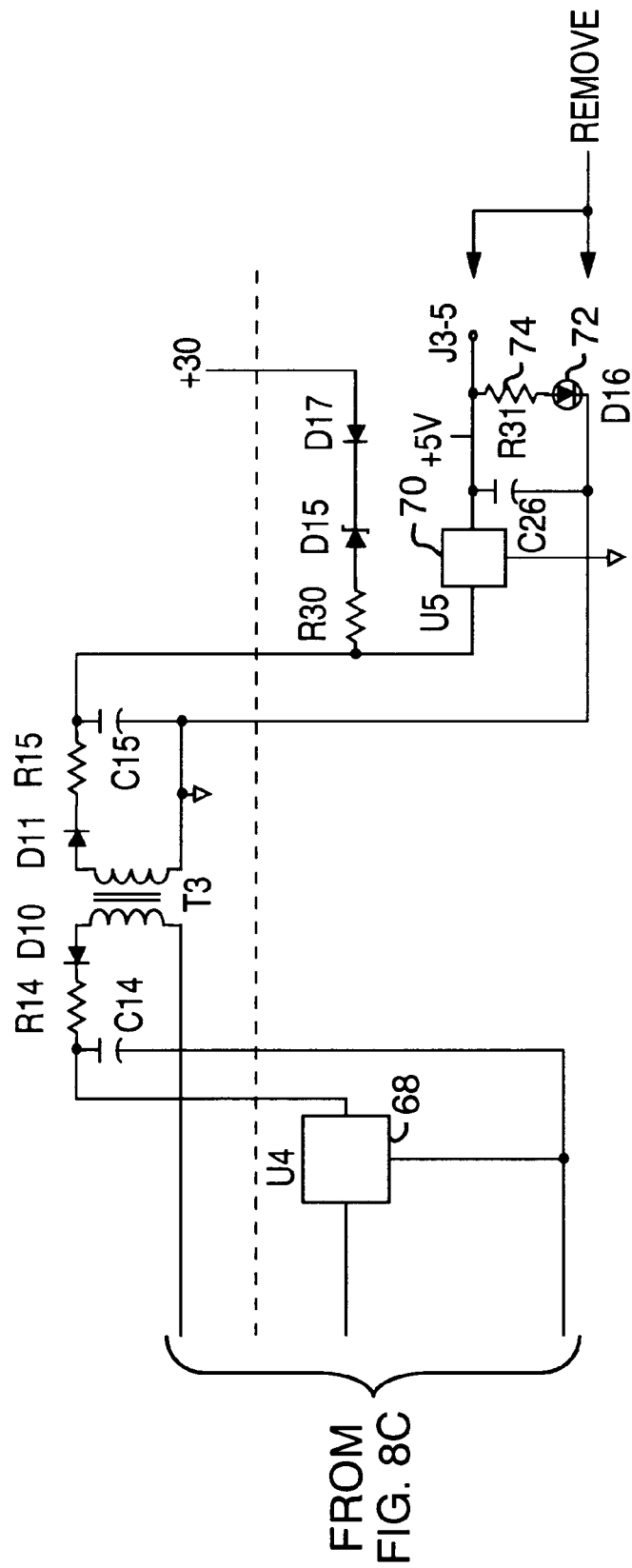

'C'=the portion of DESR curve 'H' where dDESR/dt is negative;

FIG. 3 This figure plots the performance of a prototype charger built using the method described in this patent. The figure is a simultaneous composite of the plot of terminal voltage of the battery while being charged and the DESR of the battery while being charged. The left Y-axis units are volts, the right Y-axis units are the dimensionless A/D converter counts that correlate to DESR, and the X-axis units are minutes;

FIG. 4 This figure shows the current steps used to charge the battery in FIG. 3 along with the time that the charger remained at each current step;

FIG. 5 This figure separates out the terminal voltage plot of the battery being charged in FIG. 3;

FIG. 6 This figure separates out the dimensionless A/D converter counts that correlate to the DESR of the battery being charged in FIG. 3;

FIG. 7 This figure depicts a generalized plot of the charge acceptance limit of an electrochemical cell. The Y-axis is charging current and the X-axis is State of Charge of an electrochemical cell:

'A'=The point at which the State of Charge of an electrochemical cell is at a minimum and the charging current limit is at a maximum.

'B'=The point at which the State of Charge of an electrochemical cell is at a maximum and the charging current limit is at a minimum.

'C'=The charge acceptance limit graph of an electrochemical cell.

'D'=The maximum current output of a practical charging source.

'E'=The current output of a practical charging source as it tracks the graph of the charge acceptance limit of an electrochemical cell.

Figure 9A:
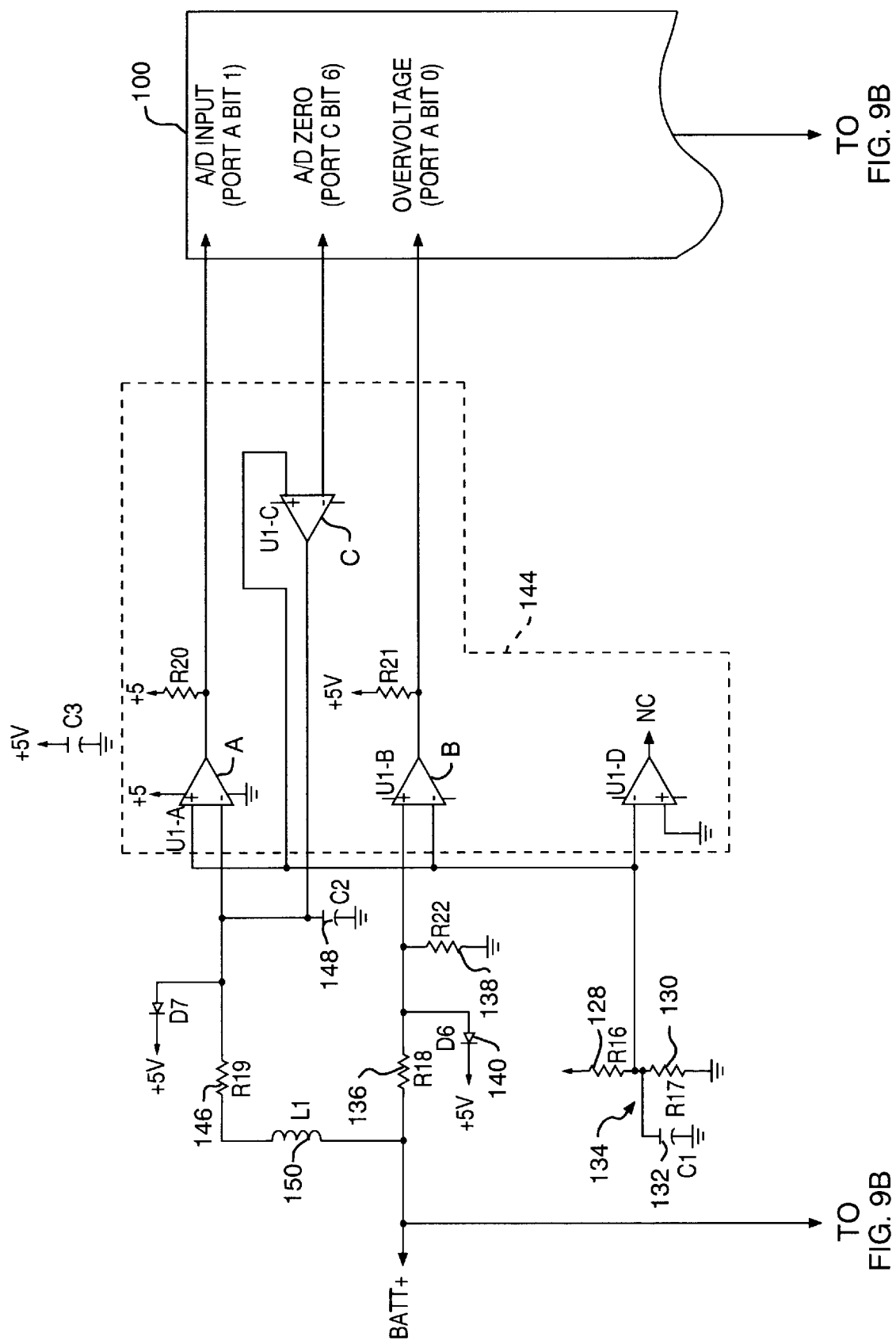

'F'=The error band of the current output of a practical charging source as it tracks the graph of the charge acceptance limit of an electrochemical cell;

FIG. 8 FIG. 8 includes FIGS. 8A–8D. This set of figures depicts the schematic diagram for the power converter section of the prototype charger;

FIG. 9 FIG. 9 includes FIGS. 9A and 9B. This set of figures depicts the schematic diagram for the measurement and control section of the prototype charger; and FIGS. 10A–10C This set of figures depicts a flow chart for the software contained in the microprocessor used to control the prototype charger shown in FIGS. 8, and 9.

Figure 11:
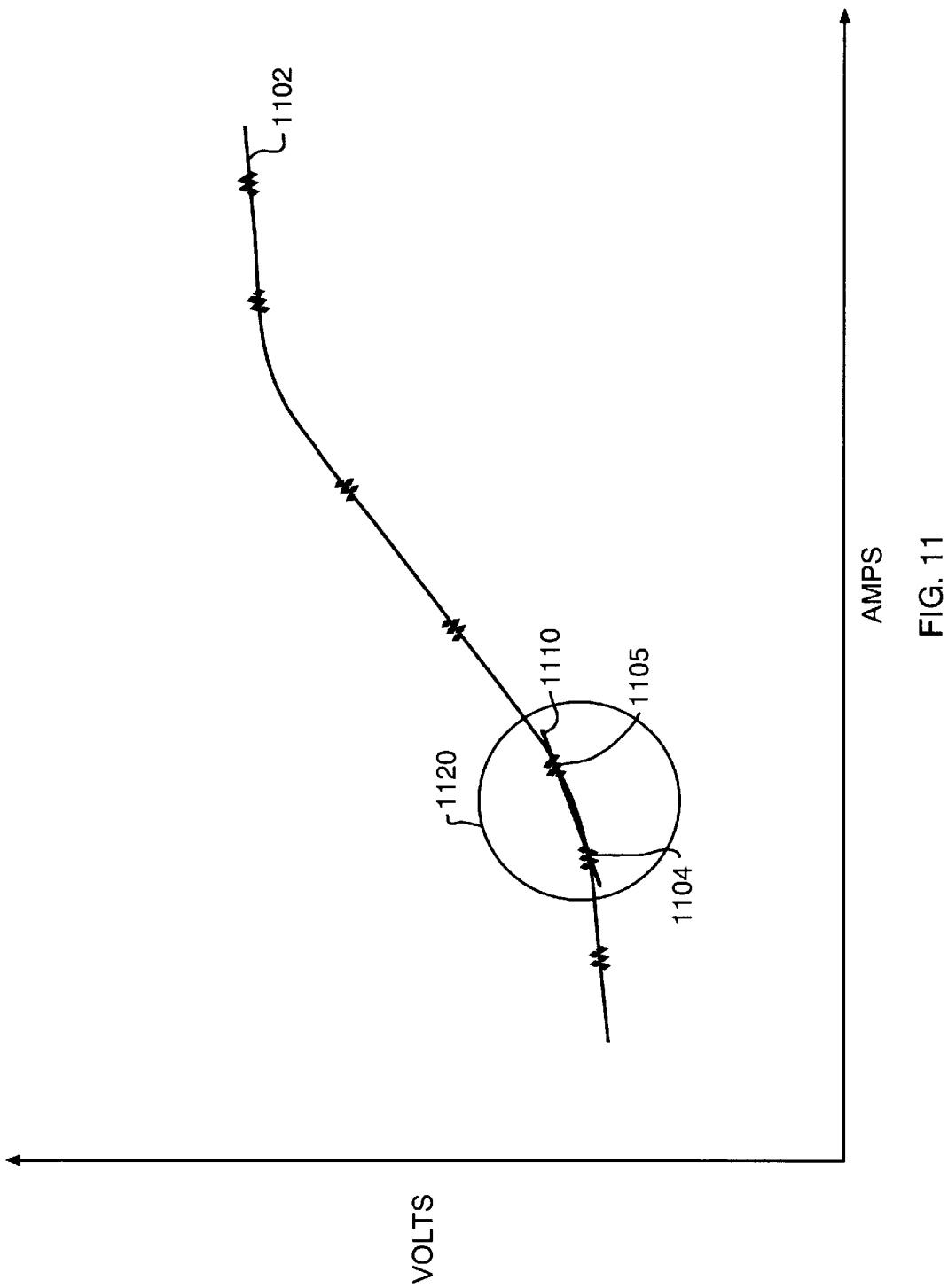

FIG. 11 This figure depicts a hypothetical graph of charging voltage versus charging current for a given state of charge of a battery:

'1102'=Sigmoidal curve

'1104'=Cluster of data points representing voltage/current data pairs about a first nominal charger output setting.

'1105'=Cluster of data points representing voltage/current data pairs about a second nominal charger output setting.

'1110'=Straight line fit to data pair clusters 1104 and 1105.

'1120'=Areas of this figure that is shown blown up in FIG. 12.

FIG. 12 This figure depicts a blow up of the straight line fit to data pair clusters 1104 and 1105 depicted in area '1120' in FIG. 11:

'1204'=Same data cluster depicted as '1104' in FIG. 11.

'1205'=Same data cluster depicted as '1105' in FIG. 11.

'1210'=Same straight line depicted as '1110' in FIG. 11.

DETAILED DESCRIPTION OF THE
PREFERRED EMBODIMENT

Referring now to the drawings wherein the showings are for the purposes of illustrating the preferred embodiment of the invention only and not for purposes of limiting same, Batteries have a charge acceptance limit, which defines a boundary beyond which an electrochemical cell will no longer accept 100% of the charge that is presented to it. Charge beyond the acceptance limit generally harms the battery. This boundary is multi-dimensional depending on many variables that are generally unknown to the algorithms of a battery charger, including battery size, temperature, charge/discharge history and, for the most general-purpose charger, even the battery type. Under a given set of these unknown conditions, however, a simple two-dimensional boundary provides a practical description of charge acceptance limit: In a two-dimensional plot of battery state-of-charge and charging current, the acceptance limit is the boundary beyond which any increase in charge or charging current will cause the battery to fail to accept 100% of the charge presented to it. When battery state-of-charge is low, the charging current at the acceptance limit is relatively high. As the battery state-of-charge increases, the charging current at the acceptance limit decreases until, at 100% state-of-charge, the limiting current approaches zero. An object of the present invention is to implement a charging system whose charging current is limited to the lower value of 1) the maximum current that the charger can deliver and, 2) the current at the charge acceptance limit. Such a charging system will bring a battery to full charge in a minimum time period and without damaging the battery.

The practical question that remains is, how can the charger sense this dynamic boundary, the charge acceptance limit? The present invention teaches that this boundary is indicated by a peaking of the Differential Equivalent Series Resistance (hereafter referred to as DESR) of the electrochemical cell that is being charged. DESR differs from ESR in the following way. ESR is defined as V/I where V and I are implicitly referenced to ground; $V=V_{measured}-V_0$ and $I=I_{measured}-I_0$. $V_0$ and $I_0$ are commonly considered to be the ground reference value of zero. As an example; the ESR of a battery that measured 13.75 volts at a current (charging or discharging) of 1.25 amps would be 13.75/1.25=11.00 ohms. DESR differs from ESR by using a differential value for V and I in the equation. Two methods can be used to extract a differential voltage and current. Method one is to determine the battery voltage at two or more DC currents. In the example charger described later, this was accomplished by dropping the charging current by a constant value periodically throughout charging. This generated paired voltages and currents that were used to determine DESR [DESR= $(V_{hi}-V_{low})/(I_{hi}-I_{low})$]. However, this is not meant to preclude the use of data points generated by increasing the current or using multiple data points (such as one high and one low). The second method is to superimpose an AC signal on the charging current and then extract the AC impedance due to the superimposed signal. By monitoring this parameter over time, a curve can be generated that peaks when a battery has reached its acceptance limit at a given current.

FIG. 1 is a family of curves that was extracted from a typical lead-acid battery. This family of curves is useful in characterizing and understanding the behavior of lead acid batteries in general. This particular family of demonstration curves was generated using one amp increments of current from seventeen amps to zero amps (see description of FIG. 1). The higher current DESR curves are to the left of the graph and the lower current DESR curves are to the right. Note that each curve peaks when the difference between the two voltages measured at two adjacent currents is at a maximum.

The shape of the curve results when the charge presented to the battery at a given current encounters additional resistance that is not encountered at lower current. This resistance manifests itself as an increase in the voltage measured at the higher current. The DESR curve rises until additional resistance is encountered at the lower current. The curve slows its rise as the additional resistance in the lower current manifests itself. The DESR curve then drops back to approximately its former level as the additional resistance at the lower current approaches that of the higher current. A peak occurs where the difference between the two resistances reaches a maximum (see description of FIG. 2).

Since charge is constantly being applied to the battery the source of this additional resistance is presumed to be the electrochemical reaction itself. This increase in resistance is an indication of the acceptance limit of the electrochemistry and correlates to the point at which side effects such as gassing begin to take place. By decreasing the current, it is possible to follow the acceptance limit along the acceptance limit curve to a state of full charge. This provides the maximum charge rate (minimum charge time) for a given size charger, provides the optimum charge to the battery, and avoids long or short term damage to the battery.

It should be appreciated that battery chargers must satisfy a large number of varying criteria that depend upon the specific application. In addition, different cost and performance goals will have a significant impact upon any charger design. Therefore, the battery charger disclosed herein is described solely for the purpose of illustrating a preferred embodiment of the present invention, and thus should not be construed as limiting same.

SAMPLE EMBODIMENT

The prototype charger incorporated an off-line, switching power converter capable of delivering 8 amps at 36 volts. The charging algorithms were stored in a microprocessor which controlled the power converter and monitored the charging of the battery. The basic algorithm used was to charge a battery with a series of descending constant currents until fully charged. A number of conditions could be encountered by the charger when attached to a battery and all of these conditions had to be dealt with in a safe and orderly manner. The following is a list of conditions and the methods with which they were handled:

Open circuit

For this charger, low cost was a concern and it was decided to power the microcomputer from the battery rather than provide a separate supply from the AC. In the absence of a battery and, therefore, microcomputer control, the power converter would throttle-back its duty cycle in a hiccup mode to self-limit its output.

Short circuit or deep discharged battery

A program resistor was provided in the power converter to allow the converter to power-up in a nominal state in the absence of microcomputer control. For a short circuit or a dead battery, the load voltage would be below that necessary for microcomputer power-up. Under these conditions, the power converter would supply the nominal current specified by the program resistor. For a short circuit, this would result in a minimal power output. For a deep discharged battery, this would allow the power converter to charge the battery until such time as the microcomputer could power-up and take over control of the charger.

Bad battery

As batteries age or are abused, their internal resistance rises until small to medium levels of current will cause large terminal voltages. An absolute voltage limit detect circuit was built into the charger that would constantly monitor the charging voltage and shut down charging if this voltage limit was ever exceeded. This feature also provided a degree of safety with respect to the output terminals of the charger.

Extremely low battery voltage

At some low battery voltage, the microcomputer powers-up and takes control of battery charging. Our experience with extremely deeply discharged lead-acid batteries revealed that the initial DESR would actually decrease for a brief period of time before entering the normal mode of behavior as shown in FIG. 1. Since this negative slope would ordinarily indicate that the dDESR/dt peak had been passed, a technique was needed to inhibit range switching until the appropriate time. Range switching was inhibited until the slope of the dDESR/dt curve at the maximum current was negative and the voltage measured at the maximum current was greater than some threshold value.

Normal charge mode

The basic algorithm for battery charging was to begin charging at 8 amps. Periodically, the voltage at 8 amps was determined, the voltage at 7 amps was determined, and DESR was calculated. When the dDESR/dt peaked, the charger would decrement the power converter and continue charging at 7 amps while using 6 amps to calculate DESR. Charging would proceed in this fashion until the dDESR/dt curve peaked using the two lowest non-zero currents.

Top-off or balancing

The last step in the charging algorithm was the final topping-off charge that is used to balance electrochemical cells. As the dDESR/dt curve peaked for the lowest two non-zero currents, the voltage at the higher current used to generate this peak was determined and stored. The charger was then put into its lowest non-zero current and the voltage was again determined and stored. Charging at the lowest non-zero current continued until the voltage measured reached a value that was a fixed percentage of the value between the two stored voltages (i.e.; [VLOW+X %(VHI−VLOW)]).

Holding or storing

Once a battery had been charged, the charger would turn itself off. If the battery powered system was not used for a while, the charger would periodically monitor the battery and provide the top-off sequence to compensate for the self-discharge of the battery.

During the design and implementation of this charger it became apparent that some valid assumptions could lead to simplifications that implicitly embodied the principles of the invention. The first step was to note that if the difference between any two currents was one amp then the denominator of the equation for DESR became one and the equation for DESR simplified to (VHI−VLOW). Carrying this logic one step further shows that any constant difference between current steps will merely act as a scale factor for DESR and may effectively be left out of the equation if absolute values are not needed (the case encountered in battery chargers). Taking the relative value argument one step further reveals that the absolute value of voltage is also unnecessary. All that is required is the raw conversion counts from an A/D converter to implement a battery charger since all that is needed is dimensionless trend data (see FIGS. 3 through 6 and descriptions of FIGS. 3 through 6). The charger is comprised of two basic sections, the power converter and the controller.

Power Converter (FIG. 8)

A power converter 20 is a direct off-line, switch-mode type of power supply. The ac line is rectified by a diode bridge 22 and then filtered by capacitors 24,26 to create a 300 volt dc bus. The initial turn-on surge of current charging capacitors 24,26 is limited by a N.T. thermistor 28. A wire jumper 30 provides a half-wave voltage doubler configuration for a 120 volt input and a full-wave rectifier for a 240 volt input, yielding a nominal 300 volt bus in either case. The actual bus voltage varies directly with the line voltage, from approximately 240 to 370 volts. Transistors 32,34 and diodes 36,38 form a two-transistor forward-mode inverter. A pulse applied to a gate-rive transformer 40 turns on both 32,34 simultaneously, in turn applying the full 300 volt bus across the primary of a transformer 42. This voltage is stepped down by a 3:1 turns ratio, rectified by a diode 44, filtered by an inductor 46 and capacitor 48, and then delivered to a battery 50. When transistors 32,34 turn off, the magnetizing current in transformer 42 is conducted through diodes 36,38 back to the 300 volt bus, reversing the voltage on transformer 42 and resetting the magnetic flux in the core. The ratio of the transistors 32,34 on-time to off-time is the duty cycle and varies from zero to 45% maximum. The duty cycle repeats itself at the switching frequency of 175 KHz.

The output voltage of the charger is determined solely by the battery voltage and is not controlled independently. The charger's main function is to control the charging current into the battery. It does this by slight variations in the duty cycle. For a given ac line voltage and battery voltage, a very small increase or decrease in the duty cycle will control the charging current from zero to the full 8 amps.

The charger uses a control method known as primary-side, current-mode control. The output is sensed across resistors 52,54, inverted by an inverter 56, and then compared to the current program signal by a comparator 58. This generates an error voltage which is transformed across an optocoupler 60 from the low-voltage secondary side to the high-voltage primary side. This error voltage is then compared to a sample of the current through transistors 32,34 by a pulse-width-modulation (PWM) integrated circuit 62. This generates a drive pulse with the desired frequency and duty-cycle. This pulse is amplified by transistors 64,66 and the transformer 40 and applied to the main inverter transistors 32,34.

There are two auxiliary voltages which power the charger circuitry. A voltage source 68 generates +15 volts for the PWM IC 62 and for the drive circuits on the high-voltage primary side, and a voltage source 70 generates +5 volts for the op amp and uP controller on the low-voltage secondary side. The +5 volts is also generated from the battery, assuming that there is sufficient initial charge present. A green LED 72, illuminates when the +5 volts is present. The diode 72 and a current limiting resistor 74 are redundant with the controller and should be eliminated from the final design.

A thermal switch 76 monitors the diode 44 heat sink temperature and shuts down the charger when it exceeds 90° C. After the thermal switch 76 cools, it resets automatically and operation resumes. A combination of a zener diode and a silicon controlled rectifier form an over voltage shutdown circuit 78 in the event of an output voltage condition greater than 65 volts (such as when there is no battery connected to the charger). A PTC thermistor 82 limits the current into the charger in the event the battery leads are reversed. Capacitors 84,86,88,90,92 and a transformer 94 filter the high frequency electrical noise from being conducted back out to the power line and causing radio interference (RFI).

Charger sequencing occurs as follows:

1) If the ac line is connected with a battery already connected, the charger will turn on automatically. If the battery initially has some charge available, the charger control circuitry is powered from the battery, even before the ac line is connected, and thus controls the charging current as soon as the ac line is connected. If the battery is completely discharged, the charger initially operates 'open-loop' when the ac line is connected, delivering approximately 10 amps (@ low voltage) until the +5 volt supply comes up and the uP circuitry takes control.

2) If the ac line is connected with no battery connected, the charger will turn on automatically, immediately sense an over voltage condition, and turn off. It will repeat this cycle indefinitely in a 'hiccup' mode of operation. The +5 volt LED will flash as the charger cycles on and off(uP will take over this function for the production version). If a battery is connected any time during this period, operation will then follow the sequence described in 1.

3) If the battery is removed during the charging cycle, a small arc may be drawn from the output connector depending upon the charging current at the time. Operation will then revert to the hiccup mode described in 2.

4) If a shorted battery is connected to the charger or if the output leads are shorted, the charger will deliver approximately 6 amps indefinitely (the uP will monitor the voltage and take appropriate action).

5) If a battery is connected to the charger with reversed leads, a large current surge will initially flow through the charger causing the PTC surge protector to limit the current to a very low value. Normal operation resumes when the battery leads are connected properly and the PTC has cooled.

6) As the battery reaches full charge, the uP circuitry reduces the charging current according to its unique ESR algorithm, eventually turning it off completely.

Controller (FIG. 9)

A controller 100 for the battery charger is extremely simple from a hardware standpoint. Its sole purpose is to monitor and measure the terminal voltage characteristics of the battery being charged, supply a control signal to the power converter based on an algorithm stored in ROM, and provide an indication of what the charger's status is. We chose an off-the-shelf, single board, micro-computer based on the Motorola 68HC11 because it was inexpensive, easy to get, quick to develop with and provided a simple migration path to the industry standard family of Motorola microprocessors. The charger is controlled by this single board computer that has some simple additional circuitry added. The schematic for the controller 100 includes the charger specific parts that have been added but does not show the microprocessor because any uP could be used (control lines to the uP are identified).

Hardware Description

Indicator LED's 102,104,106 (102=red, 104=yellow, 106=green) are driven directly by microprocessor I/O lines (sink).

A Digital-to-Analog Converter 107 for controlling the power converter is a simple 4 bit, 1% resistor network that is driven directly by microprocessor I/O lines. It is important to use a CMOS microprocessor that will swing all the way to the rail. Resistors 108, 110, 112, 114 are scaled 1:2:4:8 to create a simple 0–3 volt DAC.

A resistor 116 and a diode 118 is included to give the power converter a 'bootstrap' signal if the battery is so low that the microprocessor 100 does not turn on and, therefore, does not command any current. This is how the charger starts up with a very deeply discharged battery. Upon powering up, the microprocessor 100 will pull a junction 120 between the resistor 116 and the diode 118 to ground. This will effectively turn off this 'bootstrap' signal. A capacitor 122 and a capacitor 124 are filters to stop the high frequency switching noise from feeding back to the control signal and from entering and resetting the microprocessor 100. A capacitor 126 also reduces noise in the control signal.

A resistor 128, a resistor 130 and a capacitor 132 form a voltage divider 134 to generate a 2.5 volt reference.

A resistor 136, a resistor 138 and a diode 140 form an over voltage trigger using a section "B" of the LM339 comparator 144. This threshold is set at 39 volts. It forms a hardware backup in case something has gone wrong with the main A/D converter. The diode 140 is provided as a clamp to keep transients from triggering the microprocessor 100.

A resistor 146 and a capacitor 148 form a simple RC A/D converter. An inductor 150 is provided for noise reduction. A section "A" of the LM339 comparator 144 looks for a signal across the capacitor 148 of more than 2.5 volts. A section "C" of the LM339 comparator 144 is used to short the capacitor 148 to zero. Operation of the A/D converter is as follows:

Initial conditions
The section "C" output is low, shorting capacitor 148. The section "A" output is high, indicating no signal.

Start
The section "C" output is set high, but it is an open collector, so the voltage across the capacitor 148 exponentially rises due to the current in the resistor 146 from the battery.

When the voltage across the capacitor 148 reaches 2.5 volts the section "A" output goes low, indicating that the signal has crossed the threshold.

Result

The microprocessor 100 measures the time that transpires between setting the section "C" high until the section "A" goes low. This time is used in the software to convert to volts. The microprocessor 100 uses the raw counts from the timer built into the 68HC11, running at 2 MHz, so that its counts are ~0.5 uSec each. The charger's system parts have been scaled so that 40 volts input remains less than 32767 counts in order to keep the software simple.

Any microprocessor that can perform the above timing and has the necessary 8 digital outputs (4 DAC, 3 LED, 1 A/D) and 2 inputs (1 timing for A/D, 1 over voltage comparator) will work. A suitable device for the controller 100 is a Motorola MC68HC11A8 on an off-the-shelf single board computer and integrated the additional controller circuitry onto that board.

Figure 10A:
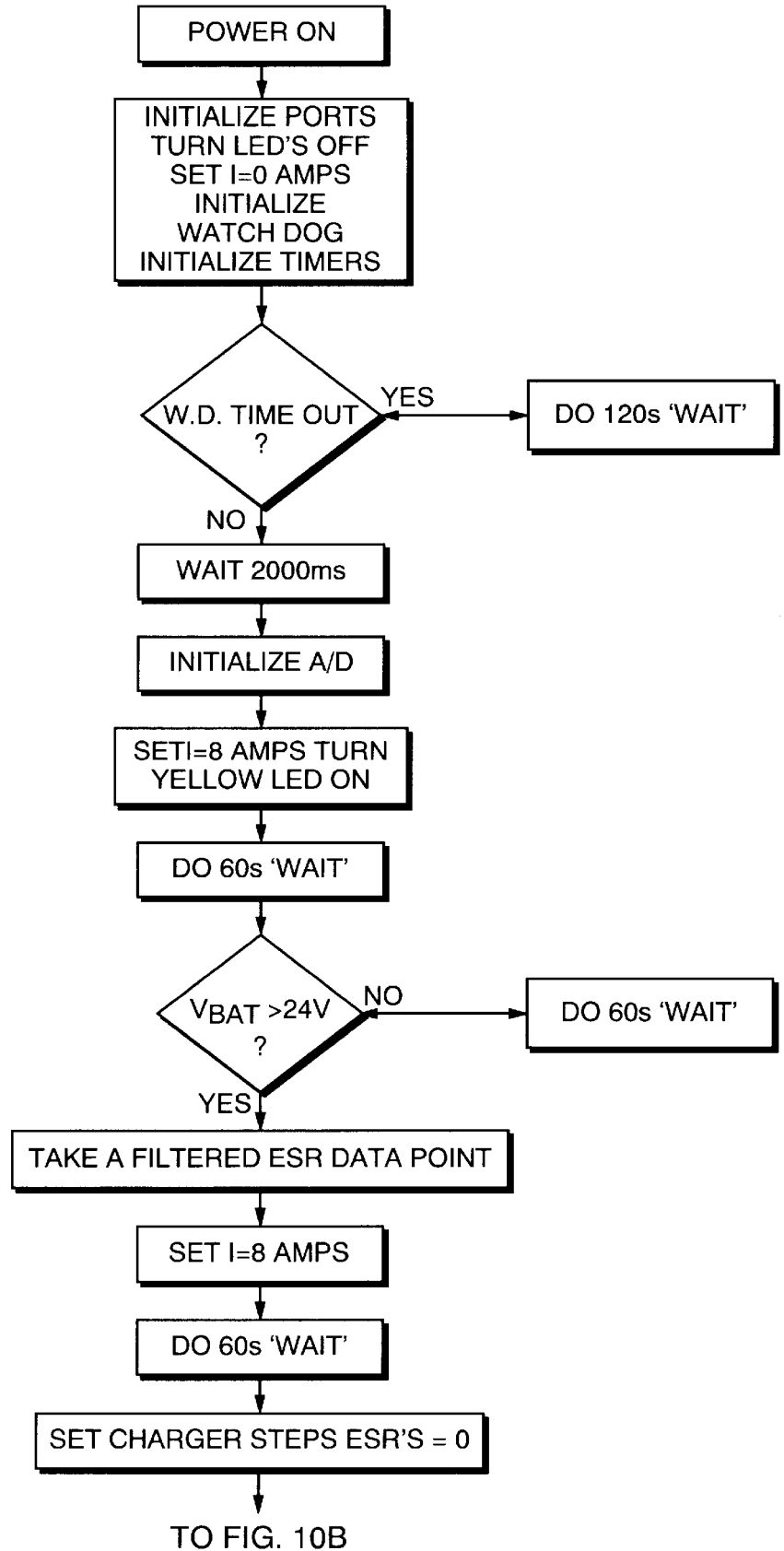
Figure 10B:
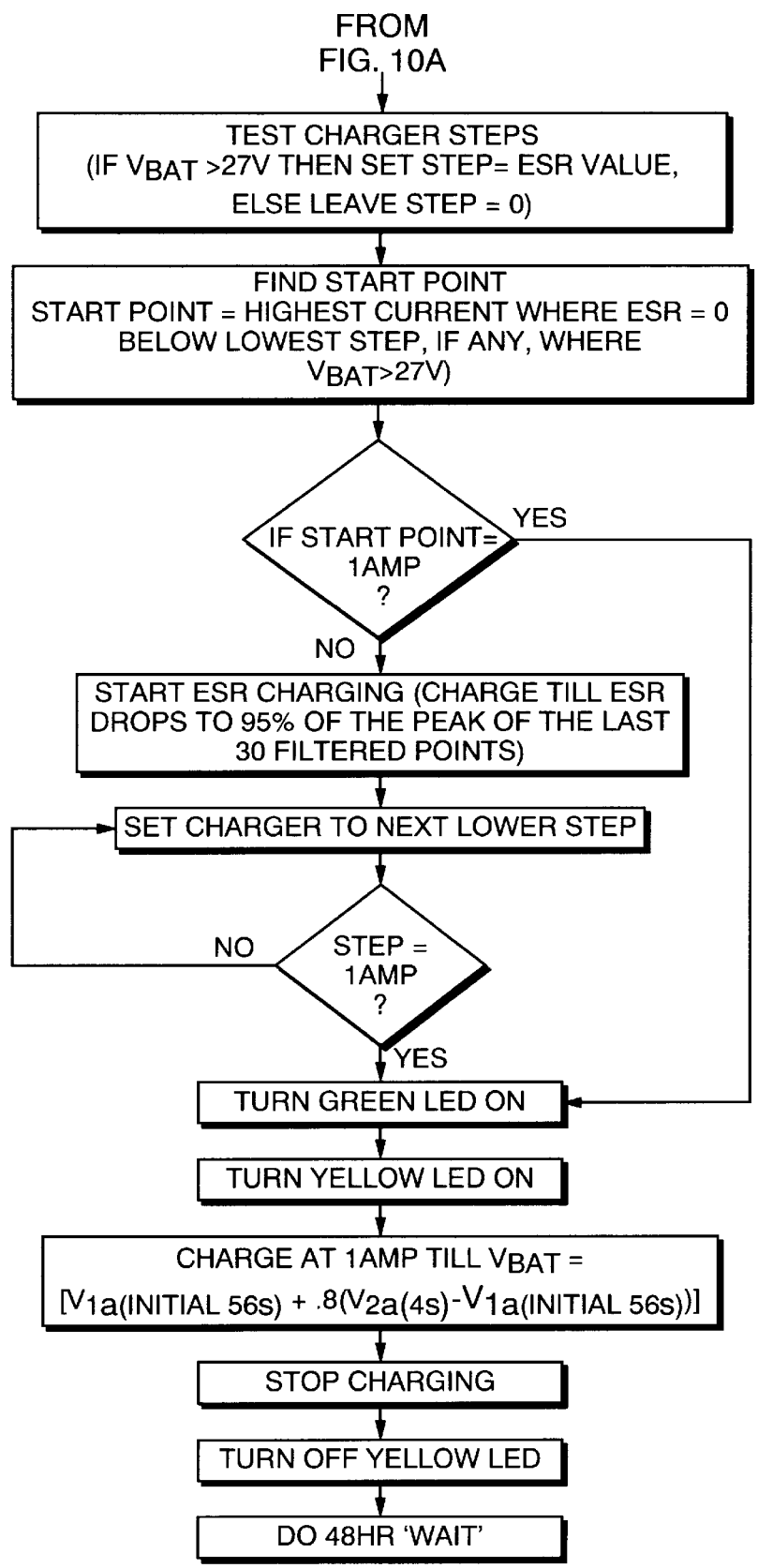
Figure 10C:
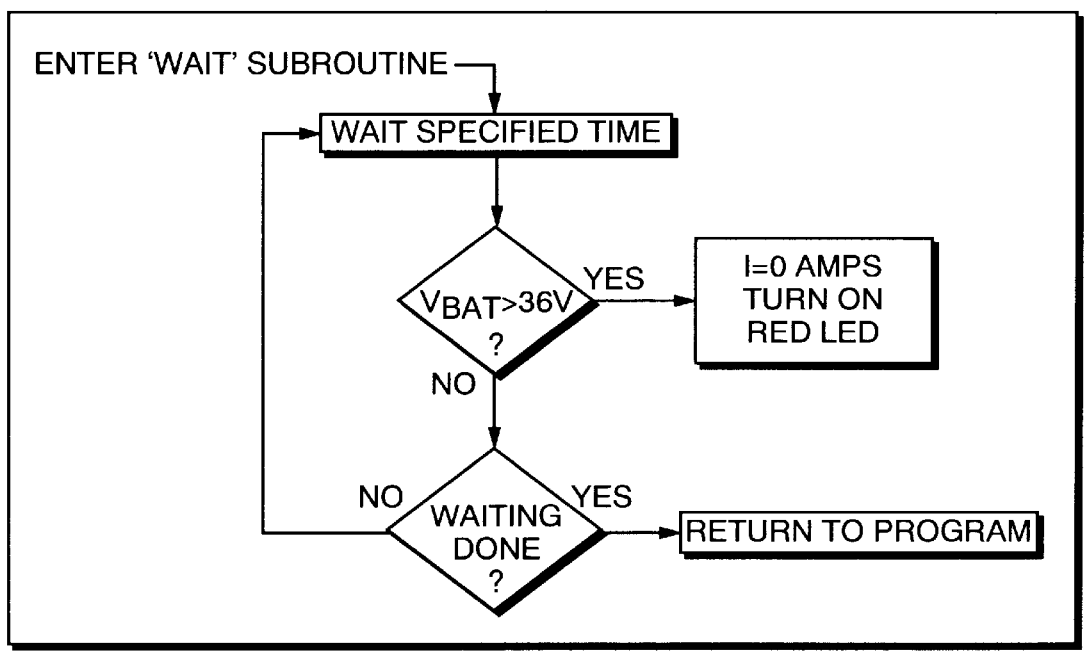

Software Description (FIGS. 10A–10C)

Referring to FIGS. 10A–10C along with the following comments, the control process of the Controller 100 will be appreciated.

Initialize software
   turn off LED's
   initialize A/D timer
   initialize 1 mSec interrupt timer used for timing seconds
Turn on charging LED
Initialize charging (gets past deep discharge conditions)
   set 8 amps
   wait 1 minute
   initialize filters and 'last peak'
   set repeat interval to 60 seconds
   wait until Volts>24 and ESR @8 amps>ESR @1 amp
1 step
   for currents of 8,7,6,5,4,3,2
   (4 bit DAC with 8 amps=count of 15; do 15,13,11,9,7,5,4)
   (4 counts=2 amps)
Do
   set current for this pass
   initialize filters
   set repeat interval to 60 seconds
   repeat until Volts>27 and drop from peak of 10%
   save voltage at end of 2 amp ESR (both voltages at 2 amps and 1 amp)
Topping off
   turn on both yellow and green LED's
   set 1 amp
   set repeat interval to 60 seconds
   wait until Volts @1 amp>(Volts @1 amp+80% of Volts @2 amp−Volts @1 amp)
Replenish
   every 48 hours;
   (do the 2 amp 1 step above followed by the topping off charge)

All waiting is done while testing for the over voltage condition. Over voltage is responded to by locking up with the fault light on and setting the current to zero.

To take ESR data, we do an A/D conversion at the present current, then we lower the current by 1 amp, wait 2 seconds, and do another conversion at the lower current. The ESR is the difference in volts (because delta amps=1). If you use a difference other than 1 amp then you will need to divide the voltage difference by the current difference to get ohms.

A/D conversions are done by taking 7 conversions, throwing away the highest and lowest, and then taking the average of the middle 5.

ESR data is filtered with a simple infinite impulse response (IIR) filter:
   new filtered=old filtered−old filtered/4+new
   output=new filtered/4

ESR data is also kept for the last 30 conversions. This is so that we can have a history of the peak of the ESR curve.

A/D conversions (discussed in the hardware section) need to be scaled to convert to volts. The basic equation is:

$$\text{Volts}=2.5/(1-exp(-t/RC))$$

where:
   2.5 is the reference voltage
   t is the time the ramp took to trip the comparator
   RC is the time-constant of R19 and C2

We don't use the converted voltage for ESR comparisons. All internal ESR calculations are done with the A/D count data. The only reason to convert to volts is for threshold comparisons (which are given in volts).

Modifications

The charger described in the sample embodiment was designed for a particular application with particular goals. Many changes can be made to the charger to optimize it for different applications. The power converter can be much bigger (higher voltage and/or current) or much smaller (lower voltage and/or current). The number and size of steps taken by the controller can be large or small. These types of changes are irrelevant to the present invention and merely present specific implementation challenges. It is also possible to obtain a complex impedance by superimposing an AC (alternating current) signal on top of the DC charging signal. As long as the frequency of the AC signal is held constant, the impedance that is obtained in this manner will be equivalent and the changing nature of this equivalent impedance will also be equivalent. What is relevant is that the DESR (or an equivalent representation) is used to monitor and/or control the charging (or discharging, or forming, . . . ) of the electrochemical cell(s) in question. Neither is it necessary for the algorithm describing the present invention to be contained in software or firmware within a microcomputer. The concept could be implemented using strictly hardware or some combination of hardware and programmable components (such as PALs or Gate Arrays). Furthermore, the present invention could be embodied strictly in software that was meant to run on some computing or controlling platform that would, in turn, operate apparatus and/or equipment connected to electrochemical cells.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. In a system comprising an electrochemical battery, means to generate a controlled time-variable charging output, means to determine battery voltages and battery charging currents associated with said charging output, and controller means, said system being characterized by a charge acceptance limit giving said time-variable charging as a decreasing function of the state-of-charge of the battery, a controller method for:

generating fluctuations in charging output about some average output level;

determining battery voltages and charging currents associated with said charging output in its said fluctuations;

determining differential equivalent series resistance as a correlation slope relating changes among said determined battery voltages to changes among said determined charging currents resulting from said fluctuations;

detecting a peak of said differential equivalent series resistance indicative of said charge acceptance limit; and, reducing said average current to maintain the cell and charging system near said charge acceptance limit as total cell charge increases.

2. A system according to claim 1 wherein said time-variable charging output means is a time-variable output voltage regulator and said means to determine battery voltages comprises system knowledge of the settings for said output voltage regulator.

3. The system according to claim 2 wherein said means to determine battery charging currents includes a current sense resistor.

4. A system according to claim 1 wherein said time-variable charging output means is a time-variable output current regulator and said means to determine battery charging currents comprises system knowledge of the settings for said output current regulator.

5. The system according to claim 4 wherein said means to determine battery voltages includes an analog to digital converter.

6. A method for controlling an electrochemical battery charger, said method comprising the steps of:

generating fluctuations in a charging output about a predetermined charging output level provided to a battery;

sensing battery voltage during said fluctuations in charging output;

sensing charging current during said fluctuations in charging output;

determining values indicative of differential equivalent series resistance as a correlation slope relating changes among said sensed battery voltages associated with changes among said sensed charging currents resulting from said fluctuations in charging output;

detecting a peak value of said values indicative of differential equivalent series resistance indicative of a charge acceptance limit and providing a signal indicative of detecting said peak value; and adjusting said predetermined charging output level in response to said signal indicative of detecting said peak value to maintain the cell and charging system near the charge acceptance limit as total cell charge increases.

7. An apparatus for controlling an electrochemical battery charger, said apparatus comprising:

generating means for generating a charging output;

voltage sensing means for sensing battery voltages associated with said charging output;

current sensing means for sensing battery charging currents associated with said charging output;

means for varying said charging output about a predetermined output level;

controller means for determining differential equivalent series resistance values as correlation slopes express ratios of changes among said sensed battery voltages to changes among said sensed charging currents resulting from said fluctuations in charging output, said controller means further including means for determining a peak value of said differential equivalent series resistance values; and means for adjusting said predetermined charging output in response to said signal indicative of detecting said peak value to maintain the cell and charging system near said peak value.

8. The apparatus of claim 7 wherein said peak value is indicative of a charge acceptance limit, and maintaining said cell and charging system near said peak value maintains said cell and charging system near said charge acceptance limit, tracking the decrease in said limit that accompanies increases in cell charge.

9. The apparatus of claim 7 wherein said generating means is a time-variable output voltage regulator and said voltage sensing means comprises system knowledge of the settings for said output voltage regulator.

10. The apparatus of claim 9 wherein said current sensing means to sense battery charging currents includes a current sense resistor.

11. The apparatus of claim 7 wherein said generating means is a time-variable output current regulator.

12. The apparatus of claim 11 wherein said voltage sensing means to sense battery voltages includes an analog to digital converter.

13. A method of charging a battery comprising the steps of:

alternately applying a first charging current $i_1$ and a different second charging current $i_2$ to said battery;

observing a first terminal voltage $v_1$ of said battery while applying said first charging current $i_1$ to said battery;

observing a second terminal voltage $v_2$ of said battery while applying said second charging current $i_2$ to said battery;

based on a predetermined relationship between said first terminal voltage $v_1$ and said second terminal voltage $v_2$, adjusting at least one of said first and second charging current $i_1$ or $i_2$, to lower values, respectively, $i_3$ or $i_4$, where $i_3<i_1$, or $i_4<i_2$.

14. The method according to claim 13 wherein $i_1<i_2$ and further comprising the step, when said second charging current $i_2$ is adjusted, of alternately applying said first charging current $i_1$, and said fourth charging current $i_4$ to the battery.

15. The method according to claim 14, wherein said method is applied for iteratively reducing currents, such that the higher and lower currents $i_1$ and $i_4$ as alternately applied, be renumbered, respectively, $i_2$ and $i_3$, said values $i_2$ and $i_3$ being lower than their original values, and the method according to claim 14 then be applied again to the renumbered currents $i_2$ and $i_1$, thus reusing the steps of claims 13 and 14 repeatedly with decreasing currents.

16. The method according the claim 13 further comprising the step, when said first charging current $i_1$, is adjusted, of alternately applying said third charging current $i_3$ and said second charging current $i_2$ to the battery.

17. The method according to claim 13 further comprising the step, when said first and second charging currents $i_1$, $i_2$ are adjusted, of alternately applying said third charging current $i_3$ and said fourth charging current $i_4$ to the battery.

18. A method of charging an energy storage device, the method comprising the steps of:

inducing a charge acceptance limit in the energy storage device by:

a) applying a first charging current to the energy storage device;
b) while applying said first charging current, determining a first resistance of the energy storage device to said first charging current;
c) applying a second charging current to the energy storage device;
d) while applying said second charging current, determining a second resistance of the energy storage device to said second charging current;
e) determining a difference between said first resistance and said second resistance as a first differential series resistance of the energy storage device; and
f) repeating steps a–e until said first differential series resistance reaches a maximum level; and,
after said charge acceptance limit of the energy storage device is realized, alternately applying to said energy storage device at least one of:
said first charging current and a reduced level of said second charging current; and,
a reduced level of said first charging current and said second charging current.

19. The method of charging an energy storage device according to claim 18 further comprising the steps of:
inducing a second charge acceptance limit in the energy storage device by:
a1) applying said first charging current to the energy storage device;
b1) while applying said first charging current, determining a third resistance of the energy storage device to said first charging current;
c1) applying to the energy storage device said reduced level of said second charging current;
d1) while applying said reduced level of said second charging current, determining a fourth resistance of the energy storage device to said reduced level of said second charging current;
e1) determining a difference between said second resistance and said fourth resistance as a second differential series resistance of the energy storage device; and,
f1) repeating steps a1–e1 until said second differential series resistance reaches a maximum level; and,
after said second charge acceptance limit of the energy storage device is realized, alternately applying to said energy storage device at least one of:
a reduced level of said first charging current and said reduced level of said second charging current; and,
said first charging current and a second reduced level of said second charging current.

20. The method of charging an energy storage device according to claim 18 further comprising the steps of:
inducing a second charge acceptance limit in the energy storage device by:
a1) applying to the energy storage device said reduced level of said first charging current;
b1) while applying said reduced level of said first charging current, determining a third resistance of the energy storage device to said reduced level of said first charging current;
c1) applying said second charging current to the energy storage device;
d1) while applying said second charging current, determining a fourth resistance of the energy storage device to said second charging current;
e1) determining a difference between said second resistance and said fourth resistance as a second differential series resistance of the energy storage device; and,
f1) repeating steps a1–e1 until said second differential series resistance reaches a maximum level; and,
after said second charge acceptance limit of the energy storage device is realized, alternately applying to said energy storage device at least one of:
said reduced level of said first charging current and a reduced level of said second charging current; and,
a second reduced level of said first charging current and said second charging current.

21. A method of charging a battery comprising the steps of:
alternately charging the battery with i) a constant first charging current $I1$ during a first charging interval $T1$, and ii) a constant second charging current $I2$ during a second charging interval $T2$, the constant first charging current $I1$ being less than the constant second charging current $I2$;
alternately sampling i) a first terminal voltage $V1$ of the battery during said first charging interval $T1$, and ii) a second terminal voltage $V2$ of the battery during said second charging interval $T2$;
compiling a set of values of $(V2-V1)/(I2-I1)$ with respect to time t elapsed since commencement of charging;
analyzing the compiled values of $(V2-V1)/(I2-I1)$ and t to locate a first set of one or more points characteristic of the onset of overcharging the battery; and,
based on locating said first set of one or more points characteristic of said onset of said state of overcharging, adjusting said constant second charging current $I2$ to a constant third charging current $I3$, the constant third charging current $I3$ being less than said constant second charging current $I2$, whereby overcharging is avoided.

22. The method according to claim 21 wherein the step of adjusting the constant second charging current $I2$ to said constant third charging current $I3$ includes adjusting the constant second charging current $I2$ to said constant third charging current $I3$ where $I3<I1$.

23. An apparatus for charging a battery comprising:
charging means for alternately charging the battery with i) a constant first charging current $I1$ during a first charging interval $T1$, and ii) a constant second charging current $I2$ during a second charging interval $T2$, the constant first charging current $I1$ being less than the constant second charging current $I2$;
sampling means for alternately sampling i) a first terminal voltage $V1$ of the battery during said first charging interval $T1$, and ii) a second terminal voltage $V2$ of the battery during said second charging interval $T2$;
a microcontroller for compiling a set of values of $(V2-V1)/(I2-I1)$ with respect to time t elapsed since commencement of charging;
the microcontroller including analyzing means for analyzing the compiled values of $(V2-V1)/(I2-I1)$ and t to locate a first set of one or more points indicative of a peak value of a differential equivalent series resistance; and,
the microcontroller including adjusting means for adjusting said constant second charging current $I2$ to a constant third charging current $I3$, the constant third charging current $I3$ being less than said constant second charging current $I2$ based on locating said first set of one or more points characteristic of said onset of said state of overcharging, whereby overcharging is avoided.

24. A method of charging an electrochemical energy storage device to a total charge voltage, the method comprising the steps of:
   (a) alternately applying a first charging current and a second charging current to the energy storage device;
   (b) measuring a first voltage provided by the energy storage device in response to application of the first charging current;
   (c) measuring a second voltage provided by the energy storage device in response to application of the second charging current;
   (d) determining a differential equivalent series resistance (DESR) from the first and second voltage, and the first and second charging currents;
   (e) modifying at least one of the first and second charging currents when the DESR crosses a predetermined threshold; and,
   (f) repeating steps (a) through (e) until the energy storage device reaches the total charge voltage.

25. A method according to claim 24, wherein said step of determining a differential equivalent series resistance (DESR) includes the step of determining a correlation slope expressing a ratio of the difference between the first and second voltages, and the difference between the first and second charging currents.

26. A method according to claim 24, wherein said step of modifying the first and second charging currents includes the step of reducing the first and second charging currents.

27. A method of charging an electrochemical energy storage device to a total charge voltage, the method comprising the steps of:
   (a) alternately applying a first charging current and a second charging current to the energy storage device;
   (b) measuring a first voltage provided by the energy storage device in response to application of the first charging current;
   (c) measuring a second voltage provided by the energy storage device in response to application of the second charging current;
   (d) determining a differential equivalent series resistance (DESR) from the first and second voltage;
   (e) modifying at least one of the first and second charging currents when the DESR crosses a predetermined threshold value, indicative of a charge acceptance limit; and,
   (f) repeating steps (a) through (e) until the energy storage device reaches the total charge voltage.

28. A method according to claim 27, wherein said step of modifying the first and second charging currents includes the step of reducing the first and second charging currents.

* * * * *